(12) United States Patent
Pounds et al.

(10) Patent No.: US 8,463,872 B2
(45) Date of Patent: Jun. 11, 2013

(54) METHOD AND APPARATUS FOR A FAMILY CENTER

(75) Inventors: Gregory E. Pounds, San Jose, CA (US);
Chris Koverman, San Jose, CA (US);
Stephen Kwo, Milpitas, CA (US);
Jonathan Cho, San Francisco, CA (US);
Shivakumar Jayaraman, Sunnyvale, CA (US)

(73) Assignee: Broadsoft Casabi, LLC, Gaithersburg, MD (US)

( * ) Notice: Subject to any disclaimer, the term of this patent is extended or adjusted under 35 U.S.C. 154(b) by 831 days.

(21) Appl. No.: 12/636,586

(22) Filed: Dec. 11, 2009

(65) Prior Publication Data

US 2010/0159967 A1 Jun. 24, 2010

Related U.S. Application Data

(63) Continuation-in-part of application No. 11/745,888, filed on May 8, 2007, now abandoned, which is a continuation-in-part of application No. 11/175,991, filed on Jul. 5, 2005, now Pat. No. 7,975,011.

(60) Provisional application No. 60/585,375, filed on Jul. 2, 2004.

(51) Int. Cl.
*G06F 15/173* (2006.01)

(52) U.S. Cl.
USPC .................. 709/219; 705/3; 455/466; 706/50

(58) Field of Classification Search
USPC .......................... 709/219; 705/3; 455/466, 50
See application file for complete search history.

(56) References Cited

U.S. PATENT DOCUMENTS

| 5,012,466 A | 4/1991 | Buhrke et al. |
| 5,999,525 A | 12/1999 | Krishnaswamy et al. |

(Continued)

FOREIGN PATENT DOCUMENTS

| EP | 1113620 | 7/2001 |
| EP | 1235397 | 8/2002 |

(Continued)

OTHER PUBLICATIONS

Boulet, et al.; *OmniPCX Office: Setting New Standards for Convergence in the SME Market*; Oct. 2002; Alcatel Telecommunications Review pp. 3-5.

(Continued)

*Primary Examiner* — Tammy Nguyen
(74) *Attorney, Agent, or Firm* — Michael A. Glenn; Glenn Patent Group

(57) ABSTRACT

A family center system and method is provided that allows receiving from a registered family member a family message intended for other registered family members and determines, based on a set of rules, to which of other registered family members to push the family message, mode of transport by which to push the family message, and the schedule according to which to push the family message. A technique involving a tile is provided that allows displaying a unified view of information onto a plurality of registered devices, regardless of device platform and/or communications network. The system and method provides a variety of services to registered family members and allows third party application plug-in for offering third party services. The system and method receives a SMS message and stores such message as a family message for subsequent access or family message treatment.

24 Claims, 11 Drawing Sheets

U.S. PATENT DOCUMENTS

| | | |
|---|---|---|
| 6,223,286 B1 | 4/2001 | Hashimoto |
| 6,453,329 B1 | 9/2002 | Dodgen |
| 6,463,462 B1 | 10/2002 | Smith et al. |
| 6,665,711 B1 | 12/2003 | Boyle et al. |
| 6,671,424 B1 | 12/2003 | Skoll et al. |
| 6,714,222 B1 | 3/2004 | Bjorn |
| 6,721,306 B1 | 4/2004 | Farris et al. |
| 6,738,981 B1 | 5/2004 | Tonnby et al. |
| 6,741,853 B1 | 5/2004 | Jiang et al. |
| 6,748,095 B1 | 6/2004 | Goss |
| 6,757,365 B1 | 6/2004 | Bogard |
| 6,826,559 B1 | 11/2004 | Ponte |
| 6,826,597 B1 | 11/2004 | Lonnroth et al. |
| 6,871,236 B2 | 3/2005 | Fishman et al. |
| 6,996,076 B1 | 2/2006 | Forbes et al. |
| 7,016,351 B1 | 3/2006 | Farinacci et al. |
| 7,027,818 B2 | 4/2006 | Bos et al. |
| 7,035,923 B1 | 4/2006 | Yoakum et al. |
| 7,149,287 B1 | 12/2006 | Burger et al. |
| 7,298,702 B1 | 11/2007 | Jones et al. |
| 7,337,448 B1 | 2/2008 | Dalia et al. |
| 7,471,653 B2 | 12/2008 | McConnell et al. |
| 7,525,955 B2 | 4/2009 | Velez-Rivera et al. |
| 7,543,034 B2 | 6/2009 | Deshpande |
| 7,610,328 B2 | 10/2009 | Haase et al. |
| 7,694,127 B2 | 4/2010 | Adams et al. |
| 7,761,871 B2 | 7/2010 | Edwards et al. |
| 7,826,603 B1 | 11/2010 | Denman et al. |
| 7,864,673 B2 | 1/2011 | Bonner et al. |
| 7,975,011 B2 | 7/2011 | Pounds et al. |
| 2001/0038624 A1 | 11/2001 | Greenberg et al. |
| 2002/0042826 A1 | 4/2002 | Gaus et al. |
| 2002/0042831 A1 | 4/2002 | Capone et al. |
| 2002/0082938 A1 | 6/2002 | Borger et al. |
| 2002/0087545 A1 | 7/2002 | Bright et al. |
| 2002/0103898 A1 | 8/2002 | Moyer et al. |
| 2002/0176404 A1 | 11/2002 | Girard |
| 2002/0194601 A1 | 12/2002 | Perkes et al. |
| 2003/0006911 A1 | 1/2003 | Smith et al. |
| 2003/0028889 A1 | 2/2003 | McCoskey |
| 2003/0070167 A1 | 4/2003 | Holtz et al. |
| 2003/0076815 A1 | 4/2003 | Miller et al. |
| 2003/0078928 A1 | 4/2003 | Dorosario et al. |
| 2003/0093187 A1 | 5/2003 | Walker |
| 2003/0185365 A1 | 10/2003 | Mansfield |
| 2003/0217110 A1 | 11/2003 | Weiss |
| 2004/0058652 A1 | 3/2004 | McGregor |
| 2004/0062383 A1 | 4/2004 | Sylvain |
| 2004/0125933 A1 | 7/2004 | Jun |
| 2004/0128344 A1 | 7/2004 | Trossen |
| 2004/0174971 A1 | 9/2004 | Guan |
| 2004/0181706 A1 | 9/2004 | Chen et al. |
| 2004/0230659 A1 | 11/2004 | Chase |
| 2004/0242230 A1 | 12/2004 | Rue |
| 2004/0248594 A1 | 12/2004 | Wren |
| 2004/0261115 A1 | 12/2004 | Bartfeld |
| 2005/0002407 A1 | 1/2005 | Shaheen et al. |
| 2005/0010475 A1 | 1/2005 | Perkowski et al. |
| 2005/0071361 A1 | 3/2005 | Hettish et al. |
| 2005/0074102 A1 | 4/2005 | Altberg et al. |
| 2005/0135315 A1 | 6/2005 | Sinha |
| 2005/0198147 A1 | 9/2005 | Pastro et al. |
| 2005/0198299 A1 | 9/2005 | Beck et al. |
| 2005/0213724 A1 | 9/2005 | O'Brien et al. |
| 2005/0249196 A1 | 11/2005 | Ansari et al. |
| 2006/0026629 A1 | 2/2006 | Harris et al. |
| 2006/0033809 A1 | 2/2006 | Farley |
| 2006/0034266 A1 | 2/2006 | Harris et al. |
| 2006/0117097 A1 | 6/2006 | Ogasawara et al. |
| 2006/0136596 A1 | 6/2006 | Izumi |
| 2006/0239242 A1 | 10/2006 | Huffschmid |
| 2007/0039036 A1 | 2/2007 | Sullivan et al. |
| 2007/0136441 A1 | 6/2007 | Chang et al. |
| 2007/0149135 A1 | 6/2007 | Larsson et al. |
| 2007/0208837 A1 | 9/2007 | Tian et al. |
| 2007/0250865 A1 | 10/2007 | Krakirian |
| 2008/0077446 A1* | 3/2008 | Korpman et al. ............... 705/3 |
| 2008/0086564 A1 | 4/2008 | Putman et al. |
| 2009/0296623 A1 | 12/2009 | Kwon |
| 2009/0305681 A1 | 12/2009 | Adkins |
| 2010/0159967 A1* | 6/2010 | Pounds et al. ............. 455/466 |
| 2010/0169263 A1* | 7/2010 | Korpman et al. ............. 706/50 |
| 2011/0159852 A1 | 6/2011 | Pounds et al. |

FOREIGN PATENT DOCUMENTS

| | | |
|---|---|---|
| WO | WO 00/18083 | 3/2000 |
| WO | 2011072306 A1 | 6/2001 |

OTHER PUBLICATIONS

Bakker, et al; *Rapid Development and Delivery of converged Services Using APIs*; Published Online Aug. 28, 2002; In Bell Labs Technical Journal, vol. 5, No. 3, pp. 12-29, retrieved on Mar. 29, 2008 from the internet: http://www.ecsl.cs.sunysb.edu/-srikant/papers/rapid_develops.ps.

Affidavit Pursuant to 37 CFR 1.56, signed by inventor Stephen Kwo, Dated Dec. 10, 2009, 1 page.

Affidavit Pursuant to 37 CFR 1.56, signed by inventor Gregory E. Pounds, Dated Dec. 10, 2009, 1 page.

Affidavit Pursuant to 37 CFR 1.56, signed by inventor Jonathan Cho, Dated Dec. 10, 2009, 1 page.

Affidavit Pursuant to 37 CFR 1.56, signed by inventor Chris Koverman, Dated Dec. 11, 2009, 1 page.

Affidavit Pursuant to 37 CFR 1.56, signed by inventor Shivakumar Jayaraman, Dated Dec. 11, 2009, 1 page.

* cited by examiner

METHOD AND APPARATUS FOR A FAMILY CENTER

CROSS REFERENCE TO RELATED APPLICATIONS

This application is a continuation-in-part of co-pending U.S. patent application Ser. No. 11/745,888, filed 8 May 2007 now abandoned, which is a continuation-in-part of co-pending U.S. patent application Ser. No. 11/175,991, U.S. Pat. No. 7,975,011 filed 5 Jul. 2005, which claims priority to U.S. provisional patent application Ser. No. 60/585,375, filed 2 Jul. 2004, each of which is incorporated herein in its entirety by this reference thereto.

BACKGROUND OF THE INVENTION

1. Technical Field

The invention relates to a communications architecture. More particularly, the invention relates to services provided in connection with a proxy-based communications architecture.

2. Description of the Prior Art

In today's world, personal computers, cell phones, smart phones, even televisions, and the like, provide services and content beyond the original purposes of these devices. For example, a personal computer doesn't simply compute, but opens browsers to remotes web sites for users to browse. As another example, as well as talking on cell phones, users can send Short Message Service (SMS) messages across mobile networks or browse the Internet. It is not uncommon for a single user to own or have access to a variety of such devices. However, when the single user desires to use any of the devices, the single user is required to become familiar with the particular platforms and run-time applications associated with each of the devices. Such requirement is a direct result of the limitations of the hardware and software of each of the devices. For example, if a user desires to open an address book from his or her PC, the user must be familiar with the particular address book application on the PC. If the user desires to open an address book on his or her smart phone, the user must be familiar with the particular address book application on the smart phone, that is most likely different from the address book application on the user's PC. Further, if the user needs to receive a message from a family member, the family member has to guess the location of the user and/or which device the user is likely to use. For example, suppose the user is a parent and the family member is the parent's child. Suppose further that at some later point in time, the child will call the parent to request that the parent pick him or her up from a friend's house. As in a typical family, the child does not know the exact location of the parent. The parent may be at home, may be outside gardening, or may even be grocery shopping. Typically, then, the child has to guess the location of the parent and then guess to which device the parent is likely to have access. For example, the child may send an SMS message to the parent's cell phone. Thus, the parent may or may not view the message in a timely manner depending on whether the parent has access to his or her cell phone at that time. The parent may have gone upstairs to a different part of the house to read his or her email on a PC and left his or her cell phone in the kitchen downstairs. Thus, the parent, reading emails on the PC, will not receive the message that requests pick up from the child in a timely manner, that is, until the parent learns that a message has been sent to his or her cell phone. Thus, it is a disadvantage to both the parent and child that the parent, sitting at the PC, was not able to receive some type of notification on the PC, as well as the cell phone, that his or her child needs to be picked up. It would be advantageous for a message sender to send a single message from one device and have that message be delivered to many devices, regardless of the different types of platforms of the devices and regardless of the different networks over which the content of the message needs to be sent. It further would be advantageous for the receiver of the message to get notification of the message at any of his or her devices and in a view that is independent of the particular type of device at which the receiver views the message, that is, in a unified view across the different types of devices.

SUMMARY OF THE INVENTION

A family center system and method is provided that allows receiving from a registered family member a family message that is intended for other registered family members and determines, based on a set of rules, to which of the other registered family members to push the family message, the mode of transport by which to push the family message, and the schedule according to which to push the family message. In addition, a technique involving a tile is provided that allows displaying a unified view of information, including family message information, onto any of a plurality of registered devices, regardless of device platform and/or communications network. In addition, the family center system and method provides a variety of family center services to registered family members as well as allows third party application plug-in for offering third party services to registered family members. In addition, the family center system and method allows receiving a SMS message and storing the SMS message as a family message for subsequent access, such as, for example, for subsequent pushing to the appropriate device according to the appropriate mode of transport and schedule.

DETAILED DESCRIPTION OF THE INVENTION

Definitions

Figure 1:
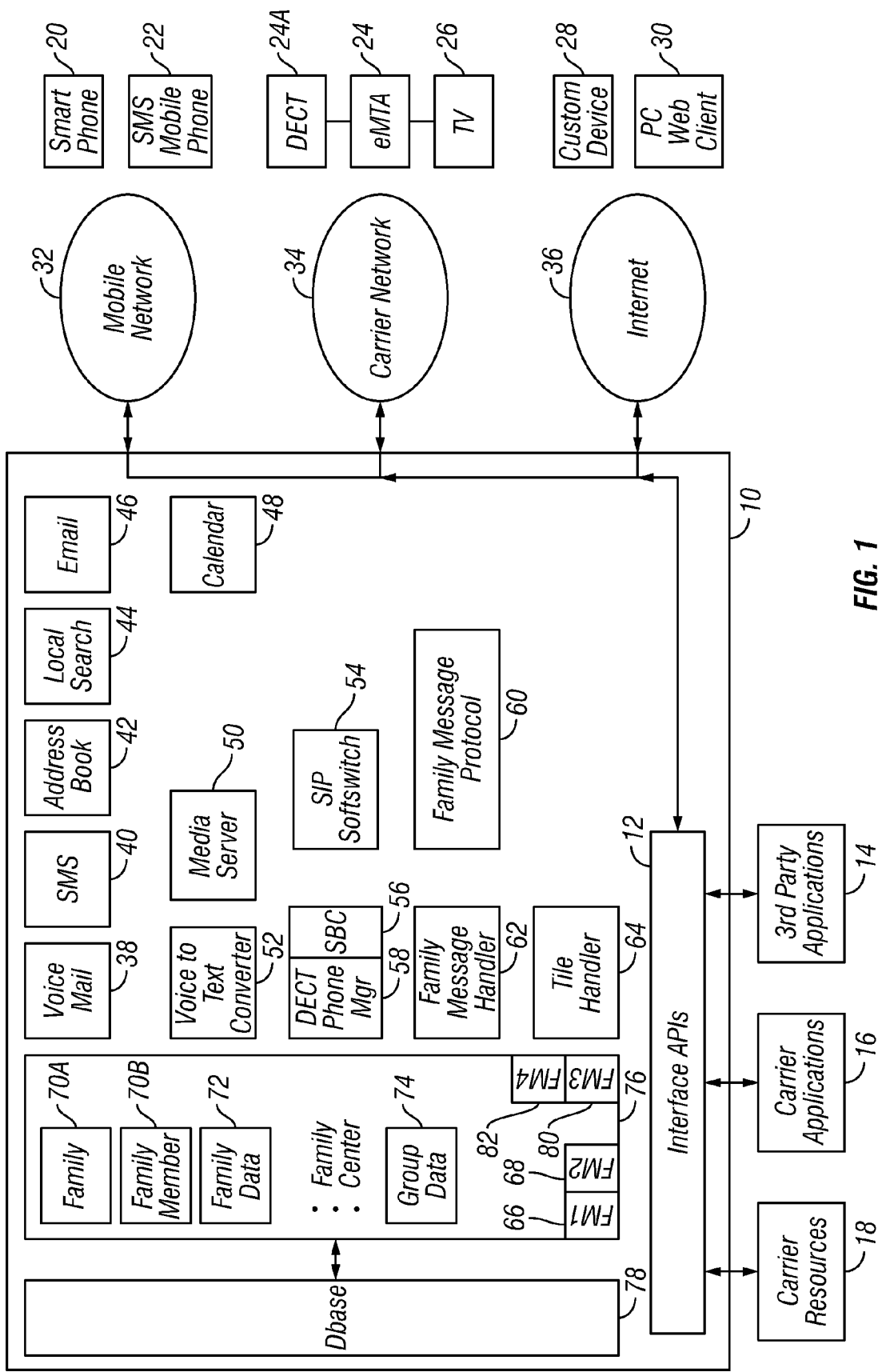
FIG. 1 is a functional block diagram showing a proxy-based family center communications architecture according to an embodiment.

The following definitions are provided to clarify particular terminology used within the discussion hereinbelow and are not meant to be limiting. It should be clear to one skilled in the art that other terms could be used to convey the same understanding and can be considered within the scope and spirit of the claimed subject matter.

fcMember or member: A configured member of the family in the Family Center system or application;

fcMessage, Family Message (FM), or message: The basic type of message that gets sent between fcMembers through the Family Center;

FC: "Family Center" or, alternatively, a Family Center solution including hosted component;

fcApplication or FC Application: fcApplication is a component or process that runs on a particular device. fcApplication may be recognized as one or more client components that work in conjunction with FC, which may be recognized as one or more core server components. fcApplication may be delivered via web, client, DECT, smart phone, and the like. In an embodiment, fcApplication provides the user interface to the outside world.

fcTile or Tile: A consistent display element that provides user actionable data that can be presented on the fcApplication home screen;

User: Any entity, e.g. person, who interacts with the fcApplication;

FamilyID: The identifier (id) that uniquely identifies the family instance;

ServiceID: The id assigned/given to a specific web service to identify that service and associated privileges;

Notifications: Event notifications are sent for event creation, updates, and cancellations; and Reminders: Event reminders are sent to remind family members than an upcoming event is arriving.

Overview

A family center system and method is provided that allows receiving from a registered family member a family message that is intended for other registered family members and determines, based on a set of rules, to which of the other registered family members to push the family message, the mode of transport by which to push the family message, and the schedule according to which to push the family message. In addition, a technique involving a tile is provided that allows displaying a unified view of information, including family message information, onto any of a plurality of registered devices, regardless of device platform and/or communications network. In addition, the family center system and method provides a variety of family center services to registered family members as well as allows third party application plug-in for offering third party services to registered family members. In addition, the family center system and method allows receiving a SMS message and storing the SMS message as a family message for subsequent access, such as, for example, for subsequent pushing to the appropriate device according to the appropriate mode of transport and schedule.

An embodiment of a family center system and method can be described with reference to FIG. 1, a functional block diagram showing a proxy-based family center communications architecture according to an embodiment. It should be appreciated that the particular details referred to hereinbelow are illustrative and are not meant, to be limiting. One skilled in the art could readily contemplate other elements or steps and still remain within the scope and spirit of the claimed subject matter.

Thus, referring to FIG. 1 and in accordance with an embodiment, a family center system 10 is provided and allows receiving from a registered family member, for example from a PC Web Client 30, a family message that is intended for other registered family members. Family center system 10 determines, based on a set of rules, to which of the other registered family members, e.g. a television (TV) 26 and a smart phone 20, to push the family message. The determination takes into consideration the mode of transport required by TV 26, e.g. over a carrier network 34, and smart phone 20, e.g. over a mobile network 32, by which to push the family message. The determination also takes scheduling into consideration. For example, family center system 10 may determine to send the family message to TV 26 first and then after a specific time, family center system 10 sends the family message to smart phone 20.

Figure 2:
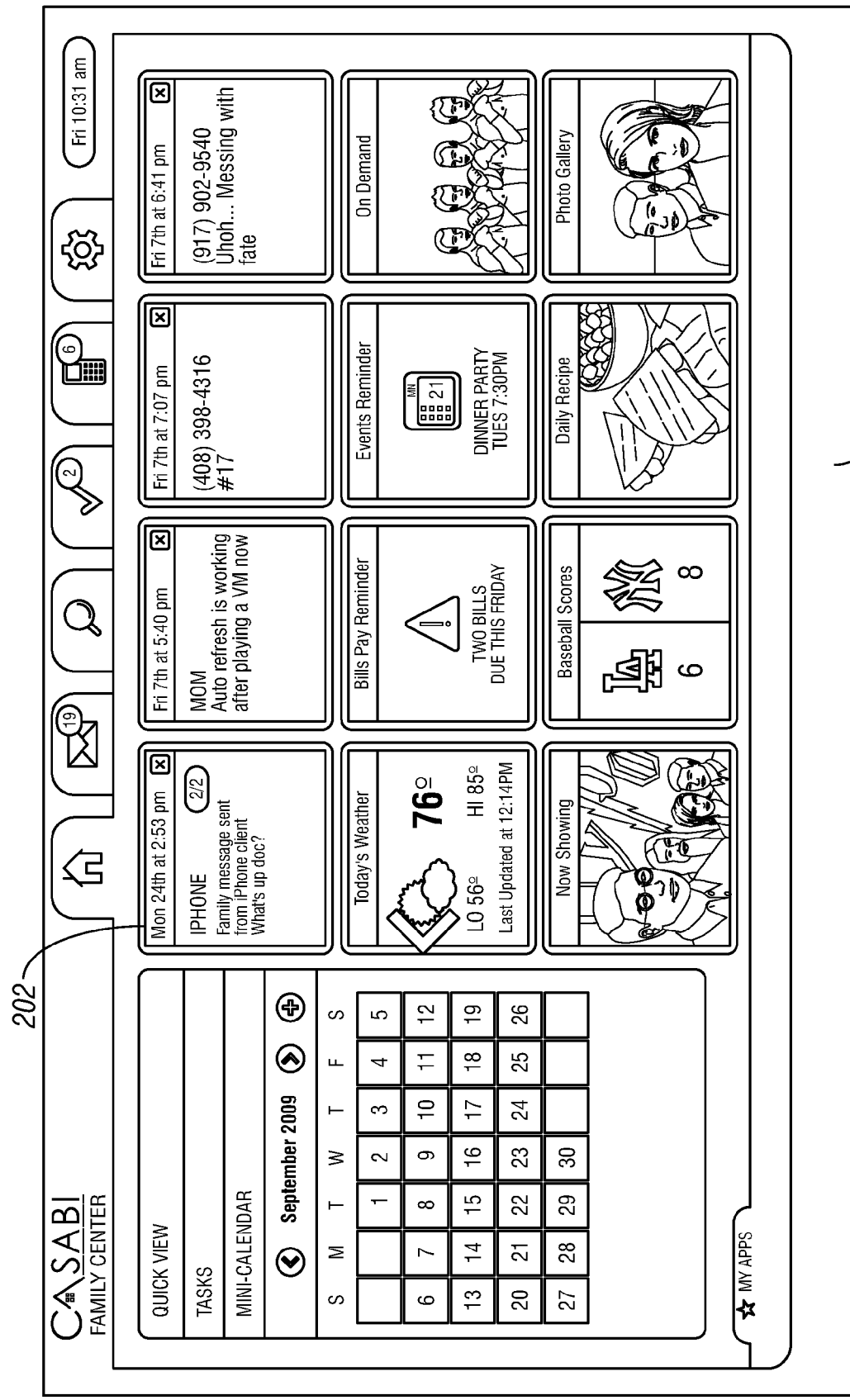
FIG. 2 is a screen shot of a family center home screen view showing twelve displayed tiles according to an embodiment.

In an embodiment, family center system 10 may determine to send the family message in the form of a tile to both smart phone 20 and TV 26. For an example of received tile, refer to FIG. 2. FIG. 2 is a screen shot of a family center application home screen 200 showing twelve displayed tiles according to an embodiment. A tile 202 positioned in the top row and in the upper left corner originated from an iPhone. Tile 202 displays a family message that originated from the iPhone. In this example, the content of tile 202 says, "Family message sent from iPhone client. What's up doc?" As well, tile 202 displays in a title bar a date and time at which the family message was sent. Tile 202 also shows that this particular family message is the second out of two (2/2) for this particular user or family member.

As the name suggests, tiles can be manipulated in a variety of ways, such as, for example, reordering tiles on the screen by drag and drop, causing an individual tile to disappear and effectively move to a next page, and so on. The multitude of features of tiles is discussed in further details throughout and, in particular, hereinbelow in the section, Tiles.

Figure 3:
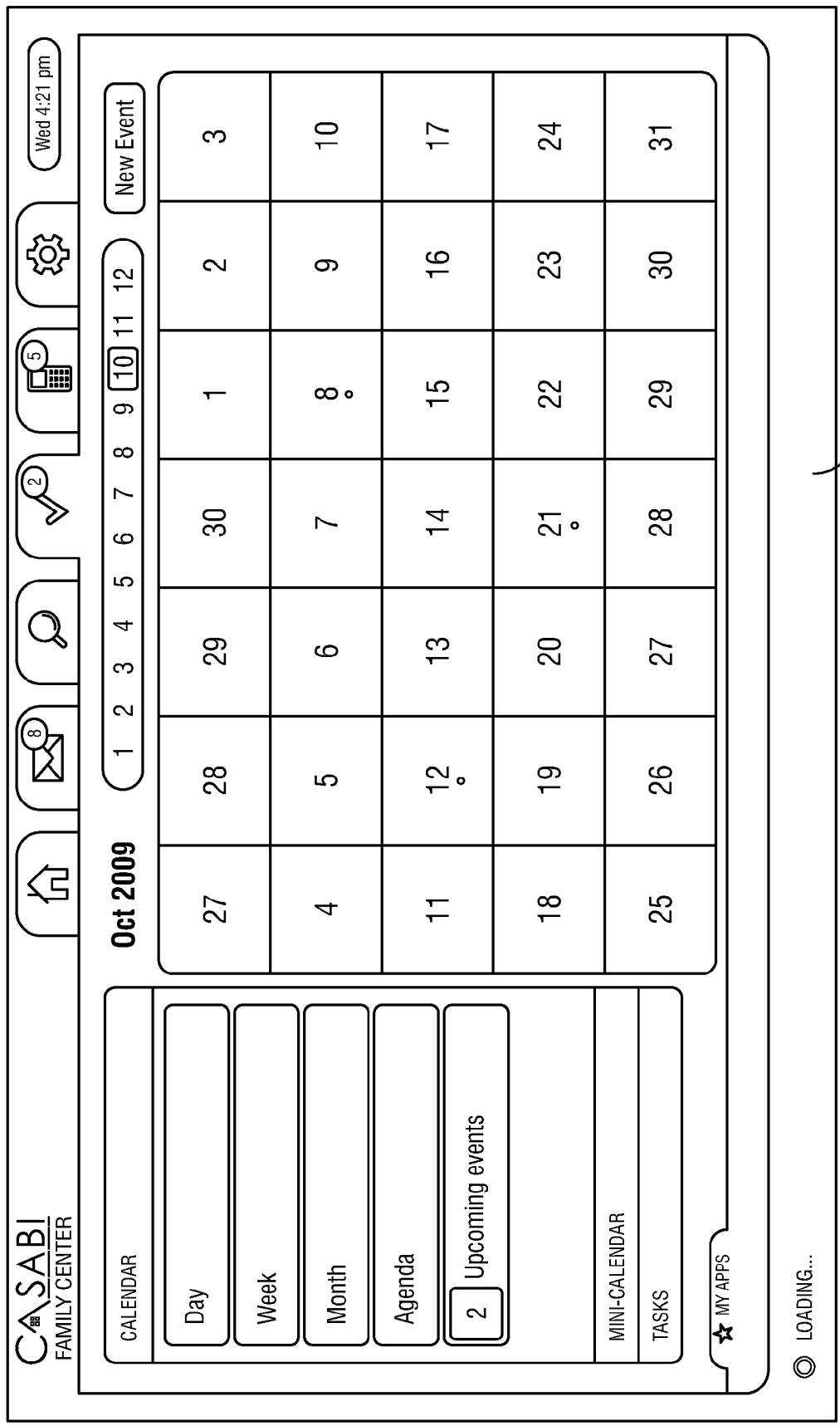
FIG. 3 is a screen shot of a family center application showing a family center calendar page according to an embodiment.

In an embodiment, family center system 10 may receive a request from one of the registered devices, e.g. PC Web client 30, for a family center service, e.g. Calendar 48. For an example of a family center calendar service, refer to FIG. 3. FIG. 3 is a screen shot of a family center application 300 showing a family center calendar page.

As well, family center system 10 may receive a request from one of the registered devices, e.g. PC Web Client 30, to deliver content from an external source, e.g. from one of the third party applications 14. In this example, at PC Web Client 30, control goes to a designated URL and content that is associated with the designated URL is presented in a separate window on PC Web Client 30.

As well, in an embodiment, family center system 10 may receive a family message from an SMS Mobile Phone 22 in the form of an SMS message and store the SMS message as a first family message 66 for subsequent access, such as, for example, for subsequent pushing to the appropriate device according to the appropriate mode of transport and schedule.

At a high level, family center system 10 provides a hosted solution to users to receive complete communications and services. However, in an embodiment, family center system 10 contains a plurality of components or processes to achieve providing a hosted solution to users. Particular components or processes of family center system 10 according to an embodiment are described hereinbelow. It should be appreciated that any of such particular components or processes can be implemented purely in hardware, e.g. as special-purpose hardwired circuitry, or in software. It should be appreciated that the use of the terms, component or process, herein may refer to either hardware or software and is not limited to referring only to hardware or to software.

Interface APIs

In FIG. 1, family center system 10 contains one or more interface APIs 12. Interface APIs 12 allow other components or processes within family center system 10 to communicate with a variety of entities. In an embodiment and as shown in FIG. 1, interface APIs 12 communicate with the following external entities: third party applications 14, carrier applications 16, and carrier resources 18. Such interface APIs 12 enable external entities (14, 16, 18) to define and address tiles through family center system 10 such that family center system 10 is able to deliver such tiles to specific registered families within family center system 10. A tile is a consistent display element that provides user actionable data that can be presented on a family center application ("fcApplication") home screen and is discussed in detail hereinbelow. Interface APIs 12 also contain APIs that define an interface between an fcApplication and family center system 10. Such interface APIs may also be used to define a tile.

In an embodiment and also as shown in FIG. 1, Interface APIs 12 interface with the following devices: smart phone 20, an enhanced media terminal adapter (eMTA) 24, TV 26, a custom device 28, and PC Web Client 30. For example, interface APIs 12 allows any of devices (20, 22, 24, 26, 28, 30) that are registered with family center system 10 to send a family message to family center system 20 such that family center system 20 ensures the family message is propagated to one or more registered family members.

Interface APIs 12 allows the family message to propagate in the form of a tile to any configured registered device. In an embodiment, a configured registered device contains part or all of a family center application, e.g. fcApplication.

It should be appreciated that when the SMS mobile phone 22 does not host an fcApplication but is registered with family center system 10, family center system 10 may send information reflecting a family message to SMS mobile phone in SMS message format. In addition, family center system 10 may still send information reflecting the family message to any of devices (20, 22, 24, 26, 28, 30) in the form of a tile.

Further details about the use of interface APIs 12 between family center system 10 and external devices (14, 16, 18) as well as devices registered with family center system 10 (20, 22, 24, 26, 28, 30) can be found in the appropriate sections hereinbelow. For example, further details can be found in the Tiles section.

Communications Networks and Devices

Interface APIs 12 allow family center system 10 to communicate with external entities (14, 16, 18) and the registered devices (20, 22, 24, 26, 28, 30) over a variety of networks. It should be appreciated that in an embodiment such communication is bi-directional. As an example, interface APIs 12 allow communication with smart phone 20 and SMS mobile phone 22 over a mobile network 32. Interface APIs allow communication with eMTA 24 and TV 26 over a carrier network 34. Interface APIs 12 allow communication with custom device 28 and PC Web Client 30 over the Internet 36. An example of custom device 28 is a tablet, e.g. an eight-inch screen that sits on a kitchen counter, that contains a copy of fcApplication, or part of such application, that is associated with the tablet so that customer device 28 is in communication with family center system 10. Another example of custom device 28 is a digital picture frame.

It should be appreciated that fcApplication may also run natively on a PC (not shown). For example, fcApplication may be implemented using Adobe® AIR®. Thus, in this example, fcApplication may be referred to as an AIR client. The look and feel of fcApplication as an AIR client may be similar to fcApplication as the web client, however, as an AIR client, fcApplication is present on the PC desktop without need for a browser.

It should be appreciated that in an embodiment, a DECT phone connects to eMTA 24 that is in communication with family center system 10 over carrier network 34. An exemplary DECT phone is a particular handset to which communications services are brought to individuals and is discussed in the instant application's co-pending parent U.S. patent application Ser. No. 11/745,888, filed 8 May 2007. As well, any other type of voice service that is able to be in communication with eMTA 24 may also be in communication with family center system 10 over carrier network 34.

Similarly, TV 26 is in communication with family center system 10 by TV 26 being in communication with its set-top box that is in communication with carrier network 34 that is in communication with family center system 10. Thus, family center system 10 can push content to the screen of TV 26 through the path described hereinabove and a television viewer can communicate with family center system 10 via the same path, as the path is bi-directional.

In an embodiment, smart phone 20 communicates with family center system 10 by first communicating over mobile network 32, which then communicates with Internet 36 back to family center system 10, e.g. over-the-top application. Thus, smart phone 20 communicates with family center system 10 using Internet 36. It should be appreciated that interface APIs 12 may communicate directly with SMS mobile phone 22 over mobile network 32.

It should be appreciated that the types of devices and communications networks discussed above are illustrative and are not meant to be limiting. One skilled in the art can readily understand that other types of devices and communications networks can be employed and still be within the scope and spirit of the claimed subject matter.

Family Center Services

Family center system 10 provides a variety of services to users. For example, family center system 10 provides voice mail, SMS, an address book, local directory search, email, a calendar, task or To-Do's lists, and the like. In an embodiment and referring to FIG. 1, family center system 10 contains the following components or processes: Voice Mail 38, SMS 40, Address Book 42, Local Search 44, Email 46, and Calendar 48.

An exemplary Voice Mail service, Address Book service, Local Search service, and SMS or Instant Message service can be found in the instant application's co-pending parent U.S. patent application Ser. No. 11/745,888, filed 8 May 2007.

Further detailed descriptions of Address Book 42, Local Search 44, and Calendar 48 can be found hereinbelow in individual sections under the title of the same name.

It should be appreciated that the types of services discussed above are illustrative and are not meant to be limiting. One skilled in the art can readily understand that additional or different services may be provided and be within the scope and spirit of the claimed subject matter.

Tile Handling

Family center system 10 contains a tile handler component 64. Tile handler 64 allows the placement of tiles on the home screen of an fcApplication as follows. For example, tile handler 64 allows the placement of tiles on the home screen of fcApplication on PC Web client 30. In an embodiment, tile handler 64 receives a particular API from a source, such as a third party application 14, and based on information contained in the API, creates a particular JavaScript Object Notation (JSON) document that is associated with the API, and pushes the JSON document to PC Web Client 30. In another embodiment, tile handler 64 creates an XML data structure that reflects the information contained in the API and pushes the XML data structure to the particular registered device, such as PC Web Client 30. It should be appreciated that one skilled in the art can use any other data structure format with which to send the information contained in the API and that the JSON document and XML data structure are by way of example and are not meant to be limiting.

Further details about tiles and tile handling can be found hereinbelow in the section, Tiles.

DECT Phone

In an embodiment, family center system 10 provides one or more components that manage a registered DECT phone 24A. In an embodiment, family center system 10 contains the following components for managing DECT phone 24A: a DECT phone manager 58, a session border controller (SBC) 56, and a Session Initiation Protocol (SIP) soft switch 54, where SBC 56 is a standard third party system that manages connections to generic SIP devices. In an embodiment, the functionality of DECT phone 24A is simple, such as displaying screens or determining when a key on DECT phone 24A is pressed. For example, such components may control the user interface on DECT phone 24A. In an embodiment, SIP soft switch 54 allows voice calls to be placed between one or more DECT phones that are registered to a same family. Exemplary DECT phone functionality is discussed in the instant application's co-pending parent U.S. patent application Ser. No. 11/745,888, filed 8 May 2007.

Voice to Text Converter

In an embodiment, family center system 10 contains a voice to text converter component 52. Voice to text converter 52 converts voice input stream to text output. Third party voice to text converters are readily available on the market and may be used within family center system 10. As an example, a family member may pick up DECT phone 24A and as he or she is getting ready to leave the house, sends a family message from DECT phone 24A intended for delivery to the other family members. The family message, which is in the form of a voice message, is sent through eMTA 24 over carrier network 35 to family center system 10. At family center system 10, voice to text converter 52 converts the voice stream from the family message to text. Then family center system 10 stores the converted family message (FM2) in a family center component 76, which is discussed in further detail hereinbelow, for subsequent processing, such as being propagated to the other family members. Thus, as illustrated in this example, a user can talk into a device to leave a message that is intended for the family and doesn't have to take the time to type out the message or select or type in the names or addresses of all the intended recipients.

Media Server

In an embodiment, a media server 50 is provided that can convert input media of a variety of formats into a different type of media, also of a variety of formats. For example, suppose a family member creates a family message in a media that DECT phone 24A cannot interpret. Family system 10 determines that such family message needs to be converted to a format that DECT phone 24A can interpret, before pushing the family message to DECT phone 24A. Family center system 10 gives control to media server 50, which converts the family message to a format that DECT phone 24A can interpret, such that the converted family message subsequently gets pushed or streamed directly to DECT phone 24A.

In another example, in an embodiment, voice mail messages are recorded and played back in mp3. However, such voice mail messages are stored in family center 76 in a format that is different from mp3. Thus, when a family member, while connected to PC Web Client 10, for example, desires to listen to a voice mail message from the family center application, media server converts the voice mail message that was stored to mp3 and delivers the mp3 content to PC Web Client for the family member.

It should be appreciated that an example media server 50 is described in the instant application's co-pending parent U.S. patent application Ser. No. 11/745,888, filed 8 May 2007.

It should further be appreciated that the particular details described above are illustrative and are not meant to be limiting. It is readily apparent that one skilled in the art can contemplate adding a wide variety of devices and third party applications that can communicate with family center system 10 and still be within the scope and spirit of the claimed subject matter.

Family Center and Database

In an embodiment, family center system 10 contains a family center 76 application component that is in communication with a database 78 component. It should be appreciated that family center 74 and database 78 may be an application and repository that work together in such a way that one skilled in the art can understand that referring to family center 76 may imply referring to database 78 and that referring to database 78 may imply referring to family center 76. One skilled in the art can understand that in an embodiment, database 78 may be any third party database on the market and is used as a tool.

Family center 76 contains and handles data that embodies the notion of a family and all the attributes of a family according to an embodiment. As well, family center 76 contains and handles data that embodies the notion of a group and all the attributes of a group according to an embodiment. In an embodiment, the family is a type of group.

For example and referring to FIG. 1, family center 76 contains a data structure that represents a registered family and contains informational data about the family, family instance 72. In the example, family instance 72 is a member of a group instance 74, which is also a data structure. Also in this example and in accordance with an embodiment, family center 76 contains data reflecting two registered family members, family member 70A and family member 70B. Family member 70A and family member 70B are members of family instance data 72.

An example of an attribute of family instance 72 is a list of one or more devices that are registered to the particular family. For example, 20 smart phone, SMS mobile phone 22, DECT phone 24A, TV 26, custom device 28, and PC Web Client 30 may each be a registered device of family instance 72.

It should be appreciated that certain functionality of Group according to an embodiment are described hereinbelow in particular detail. For example, Group functionality is described in detail in the context of Address Book and Family Calendar. However, one skilled in the art can readily appreciate that the particular details are not meant to be limiting and are for illustrative purposes. Thus, while not described in particular detail, the notion of group can be used in other applications, such as, for example, group messaging through SMS or other means. As an example, a particular fcMember may create a group of individual members labeled "Soccer team" and then send an SMS message to the entire group by sending the SMS message to Soccer team as opposed to sending a particular SMS message to each individual member of Soccer team.

Family Message Handler

In an embodiment, family center system 10 contains a family message handler 62 that handles family messages. In an embodiment, family message handler 62 handles scheduling, routing, and transporting of family messages and a data definition of the family message. In an embodiment, the particular definition of family message is stored in database 78. A particular family message is associated with a family and is independent of any type of transport. Family message handler 62 handles a family message based on attributes of family instance 72 and specific rules (not shown). Such rules may reside in database 78, for example, and may be retrieved by family message handler 62 whenever needed by family message handler 62. For example, family message handler 62 determines, based on rules and family attributes, which devices, e.g. which devices are registered to the family, to push the particular family message. Continuing with the example above, family message handler 62 determines to send the family message to smart phone, SMS mobile phone 22, DECT phone 24A, TV 26, custom device 28, and PC Web Client 30, because each of such devices are registered with family center system 10.

In an embodiment, family message handler 62 determines when to send a particular family message to a particular registered device based on a particular family member's configurations. For example, family member 70A may contain data reflecting that smart phone 20 is not to receive any family messages after 10 pm and to resume receiving family messages at 7 am. Thus, when family message handler 62 receives a family message at 10:30 pm, family message handler 62 determines not to send family message to smart phone 20.

An example of family message handler 62 determining transport is as follows. Continuing with the example above, family message handler 62 receives a family message. Family message handler 62 determines the family message is to be sent to SMS mobile phone 22, which does not host any processes, such as fcApplication, for example, that is associated with family center system 10. SMS mobile phone 22 contains standard mobile phone functionality. Thus, family message handler 62 determines to send the family message to SMS mobile phone 22 using SMS 40.

It should be appreciated that in an embodiment, lists, e.g. a list of family messages or a list of tasks, can be sent via SMS to family members. As well, in an embodiment, when a task is added to a list, such task that is associated with the list is sent via SMS to family members having the list.

As well, family message handler 62 determines that the family message is to be sent to smart phone 20. In this example, smart phone 20 contains a copy of or part of a copy of fcApplication, which allows, for example, tiles to be displayed on the screen. Thus, in this situation, family message handler 62 determines to use a different transport mechanism to deliver the family message to smart phone 20 than SMS 40. Family message handler 62 determines to send the family message to smart phone 20 using a particular protocol that fcApplication can interpret.

In an embodiment, family message handler 62 uses family message protocol 60 as a transport scheme by which to send family messages to registered devices that contain fcApplication or part of fcApplication. In an embodiment, family message protocol 60 contains a list of family messages that are intended to be displayed by fcApplication. In the embodiment, such list of family messages are provided to fcApplication in a JSON document or other data structure format, such as XML.

Thus, in an embodiment, sending a family message depends on the device. When the family message is sent to a standard phone that is not configured with any part of the family center application, family message handler 62 causes the family message to be sent over SMS. When the family message is sent to a DECT phone, family message handler 62 causes the family message to be sent over SIP. When the family message is sent to a device running fcApplication, family message handler 62 causes the family message to be sent using family message protocol 60.

In an embodiment, family message handler 62 may send notifications of a new family message to a registered device and not deliver the family message to the registered device. In this case, the particular device may have access to the family message that is stored in the family center such that the family message can be viewed by a user at the registered device.

Figure 5:
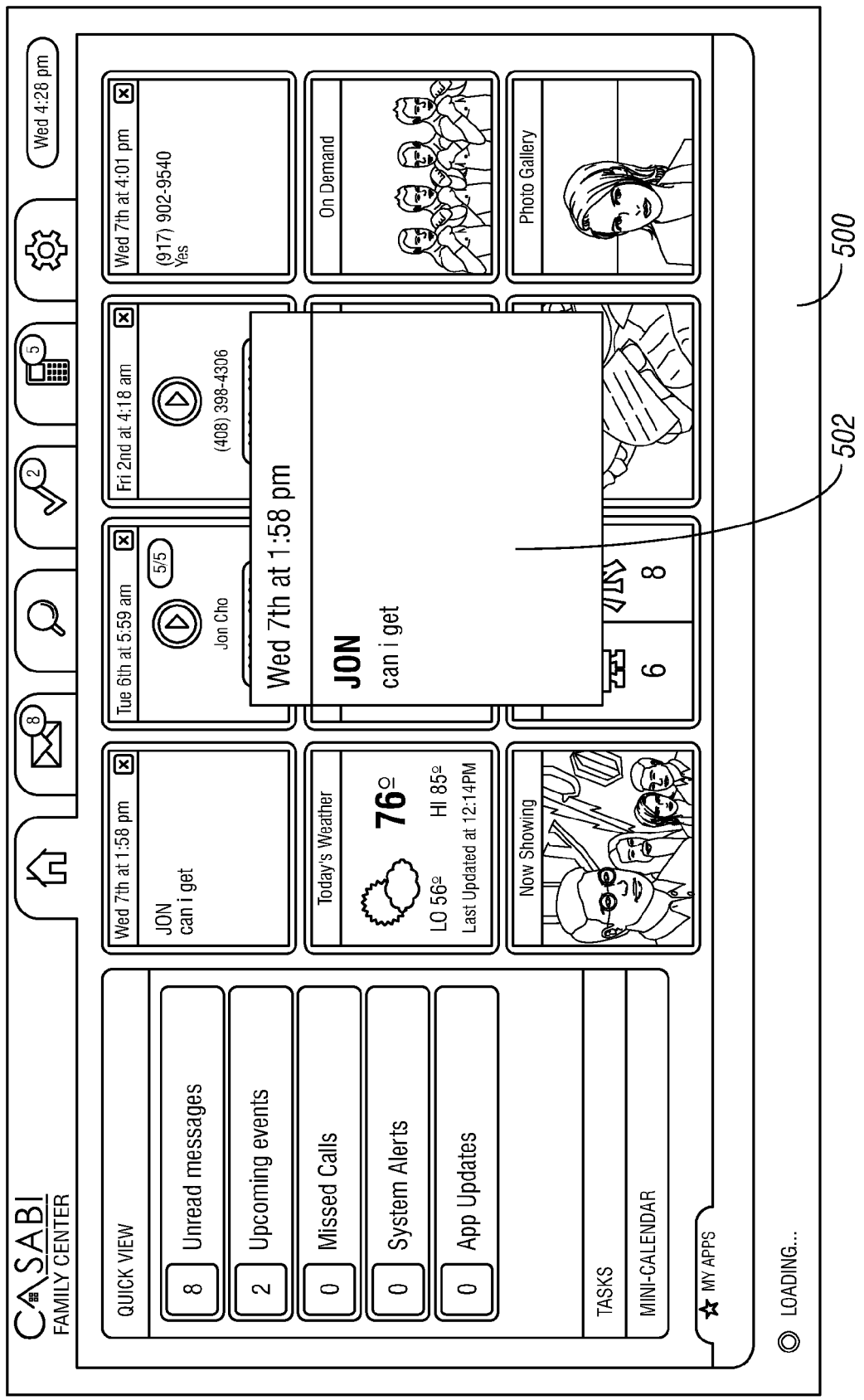
FIG. 5 is a screen shot of a family center family message view according to an embodiment.

An example of a screen shot of a family message according to an embodiment can be found in FIG. 5. FIG. 5 shows the user interface 500 of the running fcApplication and an opened tile that contains a family message. In this example, the family message was sent by Jon and the content says, "can I get".

An Example User Flow

A mother sits down at PC Web Client 30 and opens up the family center application thereon, e.g. the copy of fcApplication residing on PC Web Client 30.

Figure 4:
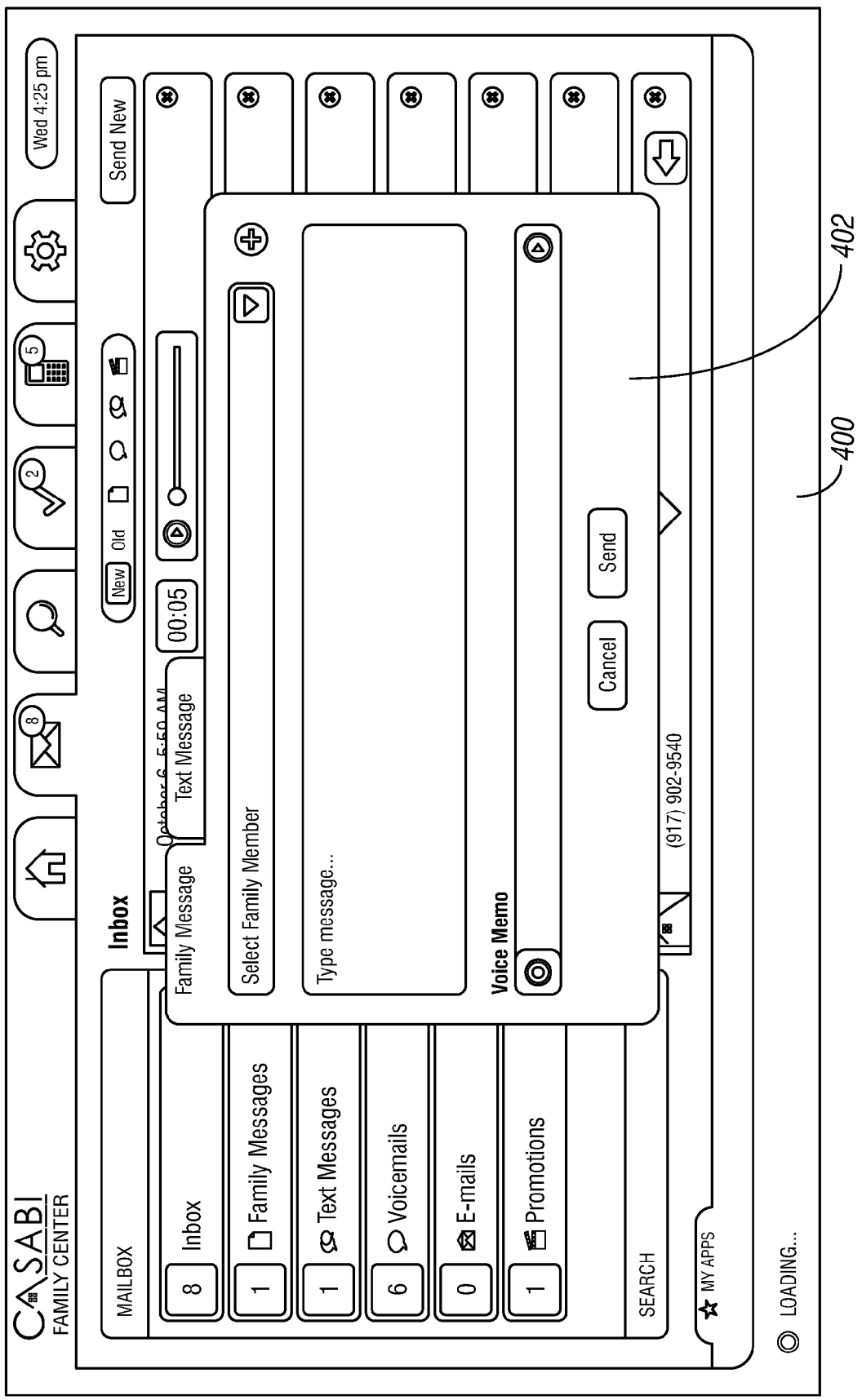
FIG. 4 is a screen shot of family center family message window for entering a new message according to an embodiment.

The mother desires to send a family message from PC Web Client 30. An example screen shot of a window for entering a new message can be found in FIG. 4. FIG. 4 shows the input object 402 on top of the family center application 400. In the example and according to an embodiment, the mother can type in her family message or record her family message and send it along. Referring to FIG. 1, in response to the mother creating the family message at PC Web Client 30, family center 76 generates and stores a copy of the family message 80. Family message handler 62 detects family message 80 is newly created and stored in family center 76. Family message handler 62 determines to whom and how to propagate family message 80. Family message handler 62 checks family members and family member devices that are registered with the family. In this example, family message handler 62 determines that family member 70A has registered SMS mobile phone 22. Thus, family message handler 62 packages data that is associated with family message 80 into an SMS message (not shown). Family message handler 62 then passes the SMS message to SMS 40, which then causes the SMS message to be sent over mobile network 32 to SMS mobile phone 22. Also in the example, another family member, e.g. family member 70B, has registered his or her smart phone, e.g. smart phone 20. Family message handler 62 packages data that is associated with family message 80 as an over-the-top smart phone application and sends the over-the-top smart phone application over Internet 36 to mobile network 32 to smart phone 20. Also in the example, a third family member is sitting in front of a television, such as TV 26. The third family member (not shown) created configuration data that indicates to family message handler 62 to show received family messages on the screen of TV 26. Thus, family message handler 80 packages data that is associated with family message 80 into a format that TV 26 can interpret and present on the screen. Then family message handler 80 sends the packaged family message through an API at interface APIs 12 over carrier network 34 to TV 26.

Thus, this example demonstrates how family messaging according to an embodiment can be a one-to-many messaging scheme.

Also in this example, a receiver of the family message decides to reply to the family message. For example, the family member at SMS mobile device 22 replies to the family message. SMS mobile device 22 generates an SMS message that gets sent over mobile network 32 through the appropriate APIs at interface APIs 12 to family center 76 and is stored as family message 82.

In an embodiment, family message handler 62 does not send a family message back to the sender. Thus, in the example, family message handler 62 determines not to send family message 82 to SMS mobile phone 22 because family message 82 was sent from SMS mobile phone 22. However, family message handler 62 packages and sends family message 82 to the remaining family members as specified.

Home Screen and Login

This section describes a home screen, login screen, and registration process of the FC application according to an embodiment. It should be appreciated that the particular details referred to hereinbelow are illustrative and are not meant to be limiting. One skilled in the art could readily contemplate other elements or steps and still remain within the scope and spirit of the claimed subject matter.

Overview

In an embodiment, the Home Screen is the home page for the FC and displays tile notifications and alerts, provides access to core FC applications, also referred to herein as processes or components, and quick access to key core FC application views. The Home Screen includes the Login Screen, which provides security to protect user access to a family's FC account.

Home Screen View

In an embodiment, the display time, day of week, and date are displayed in the upper right hand corner and are persistent in all views.

In an embodiment, branding is displayed in the upper left hand corner and is persistent in all views. The display may be customizable for carrier-branding.

Figure 6:
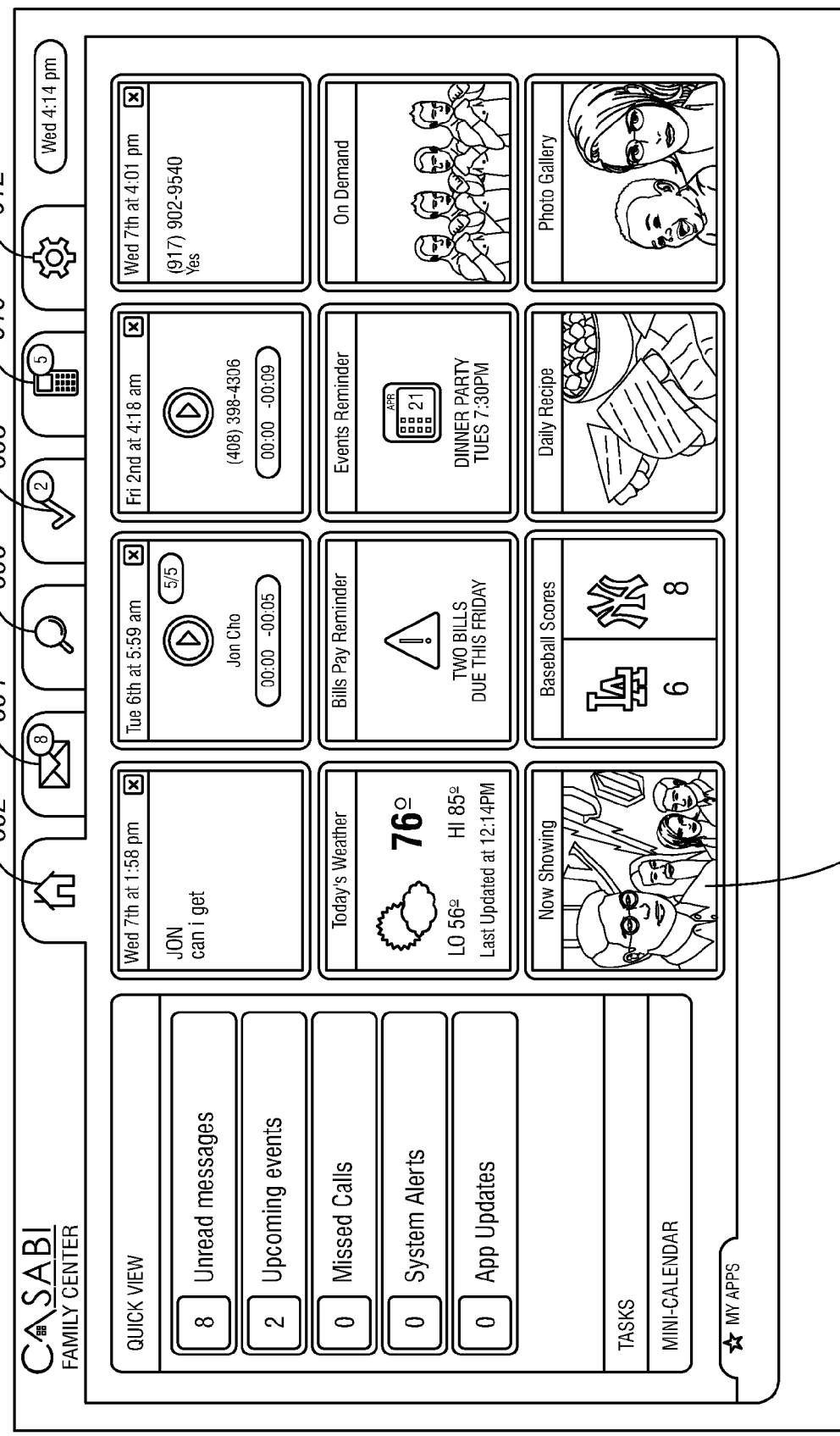
FIG. 6 is a screen shot of a family center home screen view according to an embodiment.

An example screen shot of an implementation of a Home view can be seen in FIG. 6. It should be appreciated that such implementation is by way of example and is not meant to be limiting.

In an embodiment, six major tabs are shown across the top, allowing quick access to the core FC applications and are persistent in all views, such as, but not limited to:

Home 602;
Messaging 604|Refer to Messaging section hereinbelow;
Local Directory Search 606|Refer to Local Directory Search section hereinbelow;
Calendar 608|Refer to Calendar section hereinbelow;
Address Book 610|Refer to Address Book section hereinbelow; and
To-Do|Refer to To-Do section hereinbelow.

In an embodiment and as shown in FIG. 6, a tab for Settings 612 is provided.

In an embodiment, a Display Settings link is presented in the upper right hand corner next to login/logout link for the user to access particular settings for particular core FC Applications. From the home screen, a user may click on a 'new family message' to create a new FM to be delivered to the configurable devices belonging to the 'family'.

In an embodiment, the left panel column screen menu, e.g. quick views, has the following view:

Calendar|Displays a list view of today's events, provides ability to scroll to previous and subsequent days and the ability to add a new event;
Upon clicking on an event, the FC, e.g. the core FC Applications that is associated with Calendar, displays a quick view, e.g. pop-up, of the particular calendar event with an option to "Edit". If the user decides to edit, the view changes to event 'edit' screen within the Calendar view.

It should be appreciated that a quick access menu item is provided for quick actions.

Figure 7:
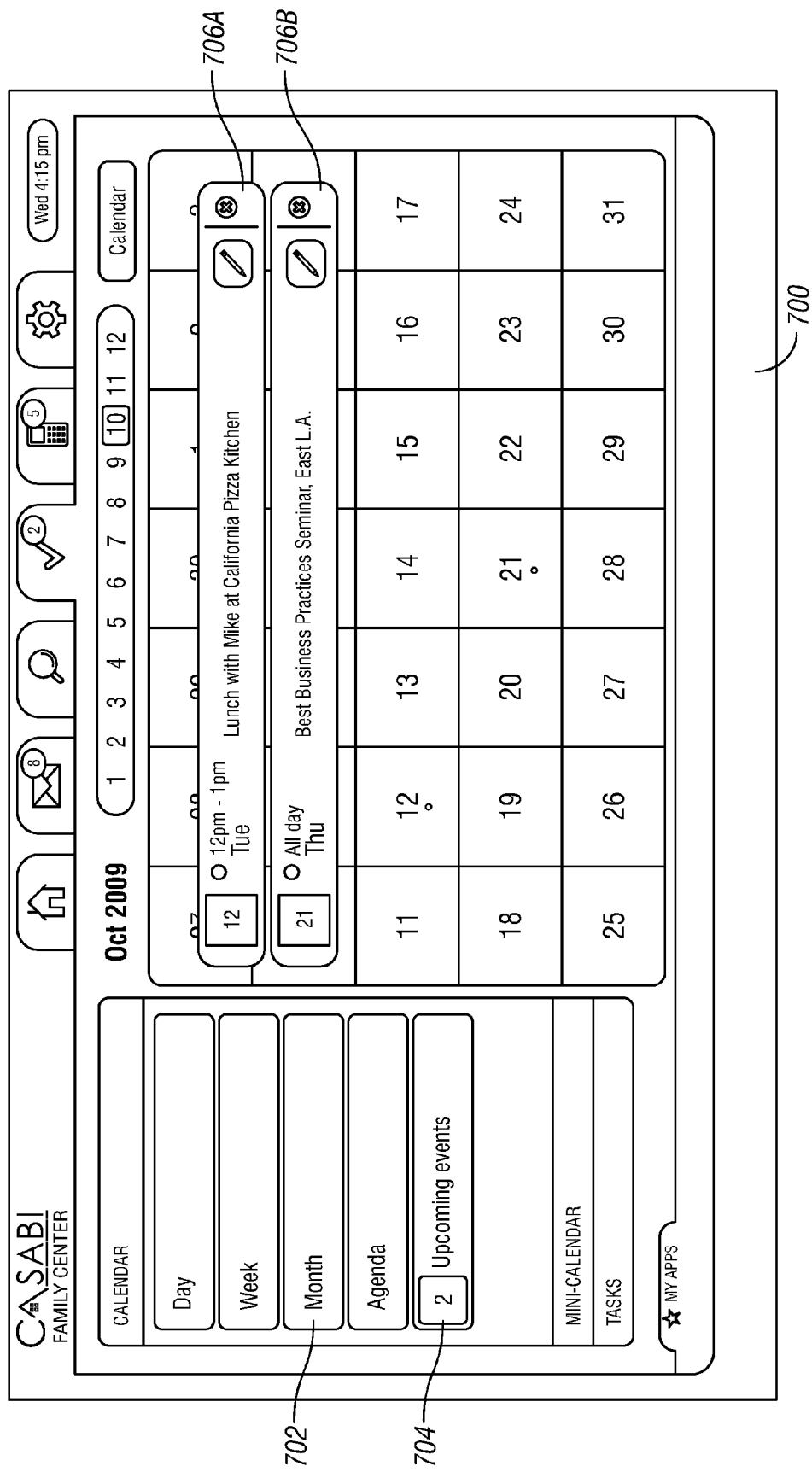
FIG. 7 is a screen shot of a family center calendar view according to an embodiment.

An example screen shot showing a Family Center Calendar 700 according to an embodiment can be found in FIG. 7. The month view is selected in the left panel 702. A quick view option for upcoming events shows that there are two upcoming events 704. Displayed on top of the calendar on the right panel are two opened events 706A and 706B, each presenting details of the particular event.

Right Hand View Displays Tiles

In an embodiment, the right hand view of the application displays tiles. Refer to the Tile section hereinbelow for details on tile features and functionality.

In an embodiment, the application refers to the following rules for displaying tiles:

Filtering Tiles|User has the option to globally filter messaging tiles, and these options can be set in the Settings menu. See Settings section hereinbelow. It should be appreciated that one skilled in the art may add other options and need not be limited by the particular examples of filtering options herein.

Filtering Voicemail and Text Messaging tiles|User can set their preferences to filter incoming voicemails and text messages that appear on the home screen to 'All', 'Favorites Only', 'Family Only', and 'None'. See Settings section hereinbelow for default settings according to an embodiment.

Filtering Family Message tiles|Users can set the preference to receive 'All' or 'None' for Family Messages. See Settings section hereinbelow for default settings according to an embodiment.

Placement of Tiles|Tiles appear in an order of priority and begin from the upper left hand corner, fill in the right pane view from left to right, and then start filling in the right pane view again from the left hand side of the right pane onto the next row below.

It should be appreciated that in an embodiment, the FC system sets the priority of a particular tile when FC system sends such tile to fcApplication. Thus, it is readily apparent that the order of tiles may be shuffled in subsequent displays by fcApplication depending upon the criticality of new information associated with the particular tile that was determined by FC system.

In an embodiment, a feature referred to as Favorites is one of the criteria used to determine routing rules for messages. For example, FC system can be configured to display only the messages from Favorites as tiles. The feature of Favorites is described in further detail hereinbelow.

Stacking of Tiles|Certain tiles, such as voicemail and text messages, can be stacked. Tiles are stacked from the most recent on top to the least recent on the bottom. A number scheme in the upper right hand corner may indicate the "# tile viewed/# of total tiles in stack". The option to stack a tile can be set in the Settings tab under the specific application, e.g. under the text messages application.

Stacking of Tiles—Viewing stacks|In an embodiment, a user can click on a particular portion of a tile to rotate such tile among stacked tiles. A visual element on the display of tiles indicates that the tiles are stacked as well as provides a location for the user to click to rotate through the tiles. For example, a user can hover to the right corner of a stack and a 'dog-ear' graphic appears. When a user clicks on that 'dog-ear' of the tile the user is able to see the next tile.

Stacking of Tiles—Delete|When a user desires to delete a stacked tile, only the top tile may be deleted.

The user may have the option to 'delete stack' and 'delete a single tile within a stack'.

Next Page view of Tiles|If there are more tiles than screen space, then the tiles may be posted to a new page.

Presented on the instant page is a clear way to navigate to the next page. As well, an indicator is provided that indicates when a new item appears on the subsequent page.

In an embodiment, it is determined when a tile is viewed, e.g. viewed by a user. For example, it may be important to an advertising company that a user views its particular tile. Thus, when a tile is placed on a second screen or page and is effectively out of the user's view, and then the user navigates to that page, the tile is now determined to be in view. When the tile is determined to be in view, a message is sent to FC system to indicate that the tile has been viewed. It should be appreciated that this determination of a tile being viewed is separate and distinct from determining that a tile is viewed from the tile being clicked.

When a user clicks on a text or family message tile, it expands to show full details.

In an embodiment, when a user clicks on the text or family message tile, such clicking action causes a message to get sent back to FC system that indicates such action. FC system tracks the action and, when configured, reports the click back to the third party application that initially created the tile.

It is contemplated that if no more characters, such as, for example, those exceeding 160 characters, can fit on one tile, determine whether to display a detail note view.

Allow for users to manage a desired prioritization and order of tiles, e.g. display text messages first, voicemails second, and family messages third. For example, a current default may be: family messages, voicemail, and text message.

In an embodiment, in the right pane for initial startup, new users can click on "start up" tiles to go through a type of introductory or walkthrough process that helps explain the following features:

Family messaging or possibly initiates a family wizard|Explains the family messaging service, and how to use it, e.g. use case and filter preferences and launches the family wizard for the user to enter in family members.

Text Messages and Voicemails|Explains text messaging and voicemails features.

Notification tiles and use of favorites to filter messages to notification|Explains and describes notification tiles and how to define which notifications are received.

Address book|Discusses the concept of family address book and ability for user to import personal address books and synchronize ("sync") to third party address books, such as, for example, Microsoft's Exchange ("Exchange").

Calendar, including ability to import and sync with Exchange|Discusses how to import calendar events and sync with Exchange.

Local Directory Search|Explains local directory search functionality.

To-Do's|Explains to-do list functionality.

It should be appreciated that such tiles described hereinabove are dismissed manually by the user. As well, it should be appreciated that such tiles can be retrieved via settings. See Settings section hereinbelow for details.

Widget Dock, e.g. the pop-up application bar on the bottom of the window view, displays system-defined third party widgets, e.g. applications in the widget dock, and is persistent in all views.

In an embodiment, the user and carrier have the ability to manage applications for the Widget Dock, e.g. pop-up bar, as follows:

Add new widget|Ability to add a new widget. A new widget is added by being pushed from the carrier or by being 'downloaded' by the user from a widget store.

Remove widget|Ability for the user to delete a widget and for the carrier to remove a widget.

Reorder widget|Ability for the user to organize and manage position of widgets as well as the ability for the carrier to define priority and positioning of widgets.

In an embodiment, default widgets in the widget dock bar are provided:

Some samples default widgets may include: View TV/Cable programming guide, Pay-per-view shows, and Access to My Account, to name a few.

Registration Flow

The following discussion outlines a registration flow according to an embodiment when the user first enters the FC application. The initial login and subsequent logins appear as part of the application. In an embodiment, it is assumed that the user receives his or her login and password information from the carrier and that the login and password are provisioned prior to the user starting the application. In another embodiment, the application requests the login or phone number and password from the user. In another embodiment, an error message for incorrect entries directs the user to call or contact the carrier to verify login name and password. In another embodiment, the application requests that the user enter in an email address, e.g. for purposes of password retrieval, and zip code. The user may be prompted to enter in the email address twice to confirm. Once the user completes the registration process, the user enters into the FC application. It is contemplated that the user may enter in the application as a family member during the registration process or may enter in the application as a family member after the registration process.

Login Screen

In an embodiment, the login screen is a screen that requests a username name and password. Upon subsequent entries may:

Provide "Forget username" link;

Provide "Forget password" link; and

Add auto-login checkbox.

Tiles

This section describes and outlines an fcTile definition and APIs to generate and display presentation within a web client, according to an embodiment. It should be appreciated that fcTile and tile are used herein interchangeably. It should be appreciated that the particular details referred to hereinbelow are illustrative only and are not meant to be limiting. One skilled in the art could readily contemplate other elements or steps and still remain within the scope and spirit of the claimed subject matter.

Overview

In an embodiment, fcTiles are displayed within the home screen of the fcApplication. fcTiles are either locally generated by the fcApplication based on information associated with message types or they are generated based on a specific fcTile packet being pushed to the client.

fcTiles provide interaction with other fcApplication data, e.g. voicemail playback, or provide interaction with third party web services, e.g. home security.

The fcTile defines both graphical information and functional information. The complete definition of an fcTile is encapsulated within a data structure, such as a JSON document or XML, for example, and pushed to the fcApplication. The fcApplication displays the fcTile, manages background functions on behalf of the fcTile, e.g. auto-update, and handles the user interaction and display of information.

The third party applications can place, or cause the placement of, fcTiles on the home screen of the fcApplication through an API into the FC system ("FC"), e.g. into a hosted component in the FC system. That is, a third party application may post a tile to the FC system. Such API contains information that describes a particular tile in detail and also particular delivery options of the tile, such as to which clients, time of day, and so forth.

Then, based on the information contained in the first API, FC creates a data structure element, such as an associated JSON document or XML structure reflecting or containing information in the API and pushes the data structure, such as a JSON document to the fcApplication through a second API. Put another way, the second API delivers the tile to fcApplication.

It should be appreciated that particular detailed descriptions herein of the first API and the second API are illustrative and are not meant to be limiting. One skilled in the art can readily appreciate that a wide variety of particular functions, parameters, attributes, and elements of such APIs can be contemplated or used and still be within the spirit and scope of the claimed subject matter.

It should further be appreciated that while the use of JSON document used hereinbelow is for illustrative purposes and is not meant to be limiting. One skilled in the art can appreciate that any other data structure, such as an XML data structure, can be used and be within the spirit and scope of the subject matter as claimed.

A user interacts with an fcTile by clicking it. The type of tile defines the subsequent interaction options.

There are multiple types of fcTiles. Each type has a specific set of feature capabilities. The fcApplication manages how those capabilities are presented to the user.

As mentioned hereinabove, there are two main but separate APIs that control or manage fcTile operation. The first API provides the external interface, e.g. from third party applications, to FC for defining fcTiles and addressing fcTiles to specific registered families within FC. The second API defines the interface between the fcApplication and FC that is used to define the fcTile. In an embodiment, the first and second APIs have the same structure but their respective individual elements may vary. An example embodiment of the first API can be found hereinbelow.

Information elements that are pushed to the fcApplication through other features e.g. through a core FC Application, such as messaging, may include some fcTile attributes. Including some fcTile attributes is desirable to inform the fcApplication how to treat specific elements. For example, a family message may have a fcTile option and priority option. When fcTile=Yes and a priority is given, the fcApplication creates a custom fcTile specific to the family message and display it in the appropriate priority location.

fcTiles are "pushed" to a family instance within FC. Pushing fcTiles to family instances insures that the fcTile is "delivered" to the associated family account. If the fcApplication is running then the fcTile is subsequently pushed to the fcApplication and an ACK is generated in return. If the fcApplication is not running then when it starts, all relevant fcTiles are sent to the fcApplication.

fcTile JSON Definition

The following parameters and/or functions define an fcTile, according to an embodiment. Such particular parameters and functions are meant to be illustrative and are not meant to be limiting. One skilled in the art may contemplate different parameters and functions and still be within the scope and spirit of the claimed subject matter. In an embodiment, components of the following definition are encapsulated within a JSON document and delivered to the fcApplication. Required elements in an embodiment are marked with a "*":

Type *: The type defines both presentation options as well as functionality within the fcApplication. Examples of particular types are:
- Video streaming: Required because when the user hovers over it displays a "play" icon.
- Calendar event: Custom type for displaying a calendar event on the home screen.
- Task event: Type for displaying a task event.
- General: Most common fcTile.
- Static: A static fcTile may be placed in the MyApps pop up tab, for example, at the bottom of the fcApplication. Such static fcTile has limited function and a separate user interface (UI) appearance.

ElementID: When the fcTile is of type Calendar or Task, then fcTile includes an element id to determine the specific information to be included in the fcTile. If the fcApplication cannot find a matching ElementID within the Inbox, Calendar, or Task list, then the fcTile is not displayed.

Header: The text displayed in the fcTile header.
- Max characters: xx

Graphic: Graphic file (.png) that displays in the fcTile. In an embodiment, the graphic matches the type of the fcTile.

Priority *: Defines the relative priority of the instant fcTile as compared to other fcTiles. The priority is used to determine placement on the home screen. With higher priority, e.g. lower #, tiles are displayed closer to the top left position to indicate highest priority, for example. In an embodiment, when two tiles have the same priority then the most recent is displayed in the higher priority position.
- Example Range: 1 to 100

TileID *: A unique number associated with each fcTile. No two fcTiles have the same ID. TileID is used in communication with FC. In an embodiment, this entry is created by FC and need not be filled in by the registered application.

Create Date *: The date the fcTile was created. This entry is created by FC and need not be filled in by the registered application.

Remove Option: In an embodiment, there are three possible ways an fcTile can be removed from the home screen:
- Manual: For example, an "X" is presented in the top right corner of the header. If a user clicks on the X the option is removed. Communicates to FC that the fcTile was removed.
- Date: The fcApplication automatically removes the fcTile on a date certain.

Network: The fcTile remains on the home screen until a subsequent remove command is received from FC.

Refresh Timer: The fcTile can be configured to send a refresh request to FC based on a configured timer. The request causes FC to query the source of the fcTile for an update and then push the update back to fcTile and possibly to other registered devices according to family settings and device configurations. Below are example settings for an example time:

Min update timer: 1 min
    Max update timer: 24 hrs

Click Function: When a user clicks the fcTile, a click event is reported back to FC to be tracked. Other subsequent actions may take place depending on configuration. The options may include:

None: No other action is taken. No change is made to the presentation on the home screen.

Display page local frame: In an embodiment, this option uses the Click URL to access a HTML page. The page is displayed within the local frame of the fcApplication. Such features allow third party developers to build web "plug-ins". The user closes the page by pressing "X" in the upper corner of the web frame. It is preferred that the HTML page fits into the specific size of the web frame.

Display page (other option): In another embodiment, this option uses the Click URL to display a .SWF file (Flash function.) It should be appreciated that one skilled in the art need not be limited to particular options for displaying content, but may contemplate a variety of other options and be within the spirit and scope of the claimed subject matter.

Display page separate frame: Uses the Click URL to access a HTML page. The page is displayed within a separate browser popup.

Stream video: Uses the click URL to access a streaming video feed. The feed is displayed within a local video player frame.

In an embodiment, a tile can include an executable program, such as, for example, a .swf file. When such tile is clicked, the tile opens the program within a frame of the fcApplication and runs the program. The program may pull whatever data is needed or desired to which it has access. For example, the program may pull data that reflects user click events. This feature allows third party partners to easily push or publish a running application and open the application within the fcApplication.

Figure 9:
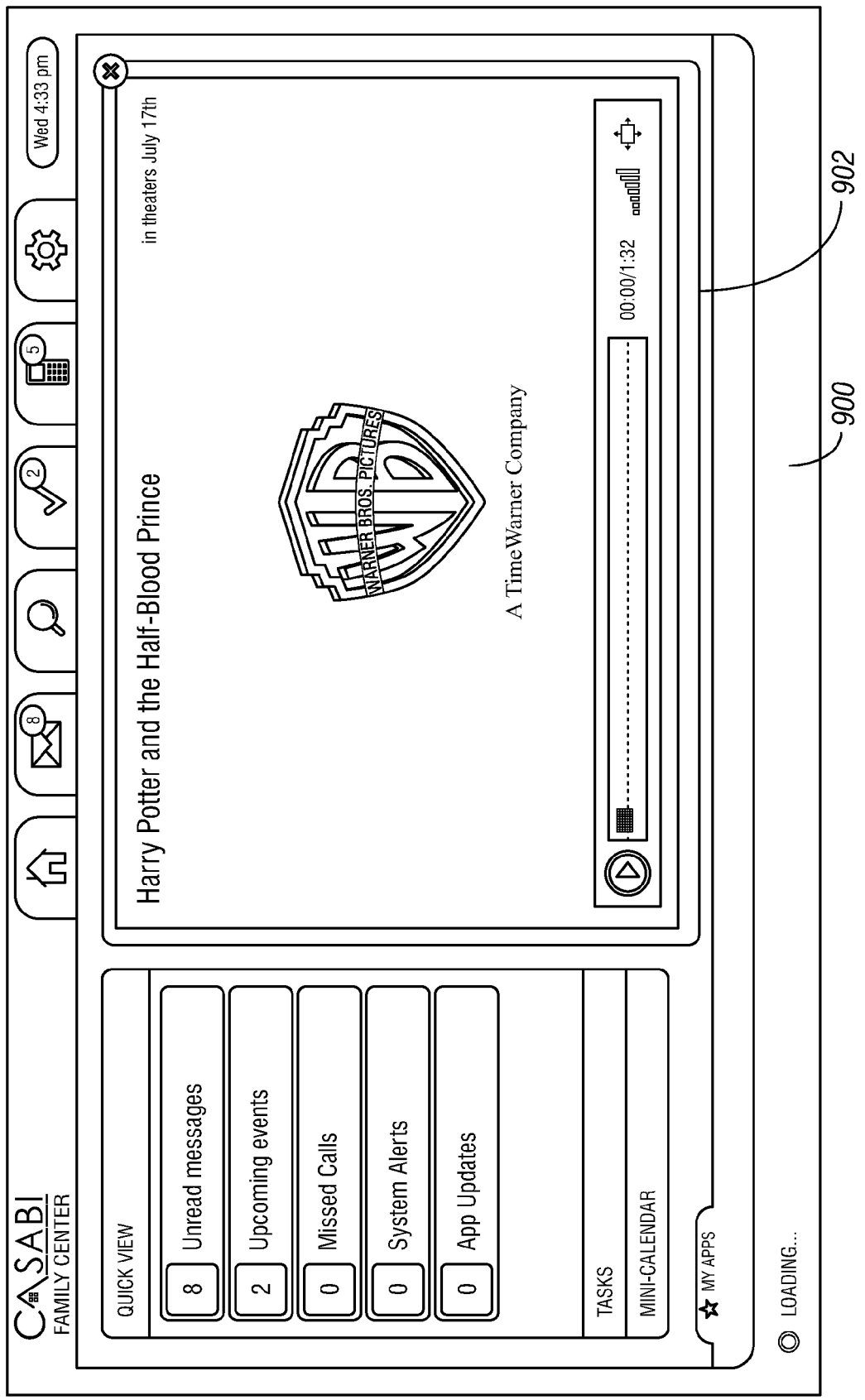
FIG. 9 is a screen shot of a family center home view playing a video stream according to an embodiment.

An example screen shot of a playing video stream can be found in FIG. 9. FIG. 9 shows a movie 902, "Harry Potter and the Half-Blood Prince," in a local frame of the right pane of the client application 900. In this example, the playing of the video stream is a result of a user clicking a tile representing the movie causing a click event, e.g. click URL, and the click event causing the streaming video feed to play within the frame. An example of a tile representing the Harry Potter movie can be found in FIG. 6. FIG. 6 shows the tile for playing the Harry Potter movie 614 in the third row and first column of tiles.

Click URL: The URL accessed when the user clicks a fcTile.

Append FamilyID: When this flag is set the fcApplication appends the FamilyID to the Click URL when Click URL is posted.

Impression Flag: When this flag is set the fcApplication sends an impression event to FC each time the fcTile is displayed on the home screen. This allows FC to keep track of each time the tile is presented in such a way that a user can see it. If the fcTile priority causes the fcTile to be located on the second page of the home screen, for example, or some other page of the home screen, then the fcTile generates an impression when it is moved to the home screen.

Generating and Interacting with fcTiles Through Third Party API

The following section outlines the functionality available to generate fcTiles and receive input back according to an embodiment. The API from a third party communicates directly with the FC itself. FC then communicates with fcApplication on behalf of the third party application. There are instances as defined in the JSON Document wherein the fcApplication communicates directly with third party servers bypassing FC, e.g. to receive video streaming and or an HTML web page.

Once FC receives the fcTile API request, FC creates the fcTile, saves it locally with the FC database and then sends a fcTile JSON Document that is associated with the particular fcTile to all relevant fcApplications.

It should be appreciated that SMS messages are sent to FC either from the network through SMS API or are newly created within the fcApplication. Thus, in an embodiment, FC receives an SMS message from the network, creates an fcTile to send the content of the message within the tile to fcApplication, and also sends the SMS message directly to standard mobile phones that do not run fcApplication.

In an embodiment, a complete API includes the following components:

Type: Defines the type of fcTile request, such as:
    New: Create a new fcTile.
    Refresh: Refresh the contents of an existing fcTile. Based on a fcTile refresh timer request or determined by the third party application.
    Remove: Remove the fcTile.

fcTile Definition JSON Document: The JSON document that describes the specifics of the fcTile.

ServiceID: The ServiceID identifies the web service that is creating an fcTile. If the ServiceID does not have fcTile privileges or is invalid then the request is blocked and an error code is returned.

Response URL: If the third party application would like to receive responses from the fcTile process, it registers a URL to receive those responses. In an embodiment, the URL includes/expects a parameter field that includes the following:

fcTileID: unique code that defines the fcTile generating the response.
    FamilyID: unique code that defines which family or family member clicked on the fcTile.
    Action parameter: Defines the action reported to or required from the third party application:
        Click: User clicked the fcTile.
        Impression: The fcTile has been displayed on the main screen.
        Refresh: Refresh timer fired or activated, which requests updated information from third party application.

Target Recipients: Defines the target(s) for the fcTile. Possible options are:
    Single: A single family defined by their familyID.
    Group: A configured group of families defined by a group ID.
    All: All fcApplications.

Delivery schedule: Defines the time and date when the fcTile is to be pushed to the configured targets.

In an embodiment, the API returns the following components:

Return result: FC receives the fcTile request, verifies the contents and returns the following results:

fcTile id: A unique number that defines the fcTile that was just created.

Failure code: Text string that states failure in creating the fcTile and the reason for the failure. For example, the JSON document might define a click function without a click URL.

Static fcTiles

A static fcTile is a reduced functionality version of the full fcTile. In an embodiment, the intended use is to allow third party applications to place a graphic with associated link in the MyApps pop up section of the fcApplication or any other designated place of the fcApplication. These tiles are not intended to be interactive. Such tiles are effectively a bookmark with graphic such that when clicked, control goes to a designated URL with or without an appended FamilyID. In an embodiment, the static fcTile requires the following subset of the full fcTile definition:

Type;
Graphic;
TileID;
Create Date;
Click Function;
Click URL; and
Append Family ID.

fcTile Management and Tracking

In an embodiment, FC provides a web interface for managing and tracking fcTiles. Such web interface may only be available to FC system administrators. In an embodiment, the web interface provides the following capabilities:

fcTile List: List of all outstanding fcTiles. In an embodiment, the list is sortable by FamilyID, Service ID, pending vs. sent, etc.

Click/Impression/Refresh/Remove Tracking: In an embodiment, the fcTile events including click, impression, refresh, or remove, are trackable and sortable by Service ID, Family ID, etc.

Settings

This section defines user settings available through the web client for Family Center, according to an embodiment. It should be appreciated that the particular details referred to hereinbelow are illustrative only and are not meant to be limiting. One skilled in the art could readily contemplate other elements or steps and still remain within the scope and spirit of the claimed subject matter.

Overview

Figure 8:
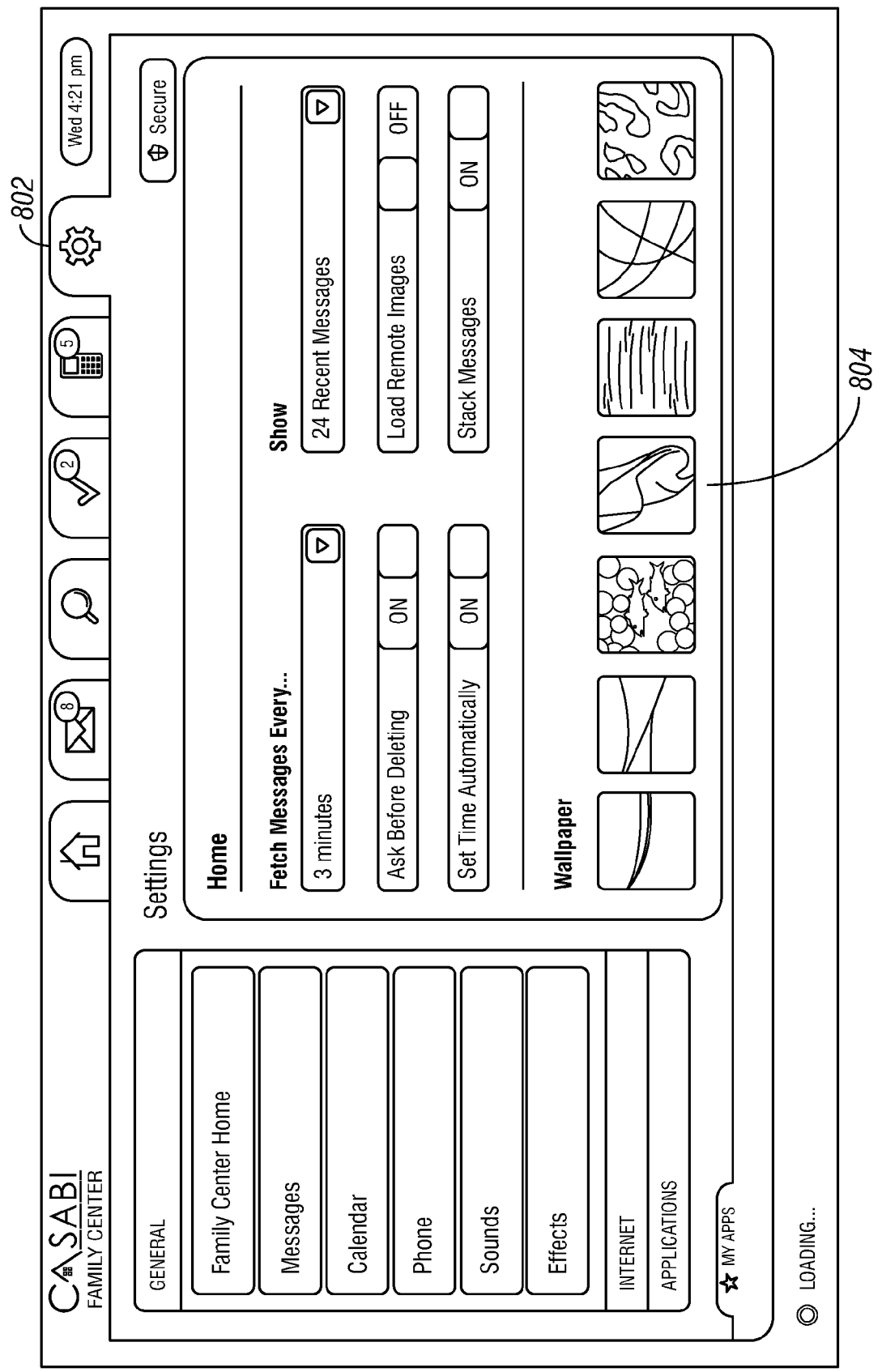
FIG. 8 is a screen shot of a family center settings view according to an embodiment.

The Settings tab on the fcApplication provides access to configuration options associated with the family's account. An example of a screen shot of a Settings view can be found in FIG. 8. FIG. 8 shows the Settings tab 802 is highlighted to indicate that the Setting view is the current view. The right panel shows actionable data that the user can interact with or provide for setting specific settings for family messages.

Upon initialization the fcApplication requests the particular JSON Settings document that contains settings for the individual family account. In an embodiment, changes are made locally within the fcApplication with the change subsequently being saved back to FC.

The Settings screen layout follows the fcApplication paradigm with left navigation pane and right full screen layout. In an embodiment, the left pane main categories are as follows:

Family Members: Provides a technique to add a new fcMembers and configure settings associated with existing fcMembers.

Features: Provides a list of native fcApplication functions and their corresponding configuration page(s).

Applications: third party applications that have been acquired and registered with the family. If applicable, each application may have its own settings page, such as the messaging setting page referenced to hereinabove.

Family Name and Members

The family members category provides a technique to manage family members, e.g. add, edit, unassign, and configure settings for each fcMember. The left pane contains a list of individual fcMembers and an add ("{+}") option.

An fcMember is indicated in the left pane by name and associated color.

In an embodiment, a shape may be added to indicate a particular family member.

Clicking on the fcMember fills in the right pane settings for that fcMember and displays the relevant family member configuration settings.

A user may customize the Family Name under the 'Family Name' field.

An administrator may enter a customized family name that can be used through the fcApplication, e.g. home page, calendar, 'family' group name in the address book, etc.

Family Member Settings

In an embodiment, each fcMember setting includes a method for obtaining more information on the item. Possible examples include: hover brings up dialog, "?" that brings up dialog. The items marked with a "*" may be included in the family member wizard setup. In an embodiment, the First Name and Color are requested to create a family member profile. In an embodiment, creation of a fcMember through the wizard or settings may also create a corresponding address book entry for that fcMember. Details of certain attributes are described as follows:

* First Name: Single entry used to identify the family member within the family, e.g. Dad or John Smith.
* Mobile phone Number: Contains the mobile phone number for the fcMember. The processing of entering the number automatically creates a US standard format (xxx) yyy-zzzz.
* Color: Each family member has an associated color. The colors are unique within the family.
* Shape: Each family member has an associated shape. The associated shapes are unique within the family.

Email Address: Each family member can configure their preferred email address to receive notifications.

Copy me on all Family Messages: Check box {default—yes}.

Receive Calendar Event Invites and Reminder Mobile Notifications: Check box with the options being the following: All, Me (include all family events), None. Default may be: {default—Me (include all family events)}.

Personal Calendar Setup: Parameters required to configure a user's personal calendar, e.g. Outlook, to sync with family calendar.

Receive To-Do Mobile notifications: Check box {default—yes}.

Add New {+}

Clicking the "+" indicator brings up an empty form and allows the user to enter the parameters for a new family member. Hitting the "Submit" button saves the values. The process also creates an address book entry of Category "Family".

Once created the Family Member entry is tied to the address book entry for the family member. Any change in either side is reflected in the other.

Family members' address book entries are not 'deleteable' unless a particular member is no longer denoted as a family member.

Edit Family Member Details

In an embodiment, within the detailed view of each family member, the user is able to modify the details of the family member, for example, as follows:

Users are able to edit the fields for an existing family member's profile.

Users may see the base form for the address book entry with an added section for family member specific fields. This form is accessible in both the Settings view and the Address Book when the user edits a family member address book entry. Specifically, the user sees the same enhanced family member form whether he or she edits the family member address book entry from the Settings page or the Address Book.

Assign/Unassign Family Member

In an embodiment, the user has the option to assign an existing address book entry and make it a 'family member'.

When an existing address book entry is designated a family member, the application prompts the user to add family member specific preferences, e.g. color. The new family member is added to the 'family' group. It should be appreciated that the new family member, as with existing family members, appears in both the family group and the 'all contacts' list.

In an embodiment, the user is able to 'unassign' a family member, i.e. denote an address book entry as no longer a family member.

It should be appreciated that by 'unassigning' a family member, the family member specific association, e.g. color and shape, are no longer stored and become available for other family members to use. Also, the address book entry for the 'unassigned' family member remains in the address book and remains removed from the 'family' group, and can now be deleted in the address book, if so desired.

Features

The Features category provides a list of the native features of FC in the left pane. Clicking on any feature brings up its associated settings, for example, in the right hand pane.

System Settings

In the system settings, the default view may appear as a read-only view, with the pertinent system fields and preferences set. In an embodiment, the user may need to enter the password to be able to edit any field. Passwords and PINs may be 'blacked out'. Below are certain settings according to an embodiment:

Family Password: Password used to access the Family account through the fcApplication. Users may be required to enter a password to edit any of the fields, including changing the password.

Passwords must be at minimum, six alphanumeric characters in length, with at least one number and one letter in CAPs.

To change a password, the user may be required to enter the current password and then enter the new password twice to confirm change.

Auto Login: When set to yes, the application may automatically login when the user accesses the web URL. May not request the user to enter a password. {Default=No}

Local Zip Code: Used to localize the family account and select the correct time zone for all devices.

Phone Number: The phone number associated with the account may be displayed and may be presented only in a read-only format.

Account Email(s): User may enter this email address upon registration. When a user forgets his password, the application may send the password to this (these) email address(es).

In an embodiment, the user has the option to add up to five additional email addresses to be notified to receive a forgotten password.

Password Protect Settings: When set provides password protection for the Settings tab. Also may provide a "forgot password" option that sends the new password to the administrator's mobile phone.

Startup tiles: User can re-display the startup tiles on the home page, once the startup tiles have been dismissed. For example, once checked, the startup tiles redisplay on the home screen. Once one startup tile has been dismissed, the checkbox of such startup tile is empty. Such concept is similar to the 'show tips' on a typical software application.

Voicemail

Below is a list of configuration parameters for how voicemail messages are displayed on fcApplication and for how a user can interact with their network based voicemail, according to an embodiment:

Display Voicemail Messages on Home Screen: Provides a list of possible options for displaying incoming voicemail messages {All, Only from Favorites, Only from Family, None}. The selection determines which voicemail messages are important enough to display on the top screen. {Default=All}

Stack Voicemail Tiles from the same user: When set to yes, VM tiles from the same user are stacked. {Default=no}

Play tone when VM is received: Allows the user to select from a list of tones to play when an incoming VM is received and displayed on the home screen. {Default=none}

Display VM Network Options: Such parameter is delivered within the Settings Document but may not be provided to the user. When set to TRUE, for example, an additional screen of voice mail network settings is provided. Options may include: Record a new greeting, select greeting, etc. Such parameter may be carrier specific. In, an embodiment, the user interface shows a blank page when option is set.

Voicemail PIN: Voicemail PIN is associated with the phone number for the family account.

To change the PIN, the user may be required to enter the current PIN and then enter the new PIN twice to confirm change.

For forgotten PINs, user may be able to click on a link to send the 'forgotten PIN' to the email address(es) as identified in the System Settings.

Text Messaging

Below is a list of configuration parameters for how TEXT messages are displayed on fcApplication, according to an embodiment:

Display TEXT Messages on Home Screen: Provides a list of possible options for displaying incoming TEXT messages {All, Only from Favorites, Only from Family, None}. The selection determines which TEXT messages may be important enough to display on the top screen. {Default=None}

Stack TEXT Tiles from the same user: When set to yes, TEXT tiles from the same user are stacked. {Default=Yes}

Play tone when TEXT is received: Allows the user to select from a list of tones to play when an incoming TEXT is received and displayed on the home screen. {Default=none}

TEXT Message Forwarding: When set to Yes, TEXT messages sent to the Family are also forwarded to entries in the text forward list. {Default=No}

TEXT Message Forward List: A list of mobile phone numbers that intend to automatically receive forwarded TEXT messages. In an embodiment, the user interface allows users to add/delete entries in the list. User may pick forwarded numbers from family address book, favorites, and address book, and the like.

Family Message

Below are configuration parameters for how family messages are displayed on fcApplication, according to an embodiment:

Display Family Messages on Home Screen: Provides a list of possible options for displaying incoming voicemail messages {All, None}. The selection determines which family messages are important enough to display on the top screen. {Default=All}

Play tone when Family Message (FM) is received: Allows the user to select from a list of tones to play when an incoming FM is received and displayed on the home screen. {Default=Something}

Calendar

Below is a list of configuration parameters, any of which may be used to set calendar display in fcApplication, according to an embodiment:

Day Start and End Time: Default setting may be 8 am to 6 pm, for example. User may change the time in ½ hour increments and by entering a new time or by clicking on a 'up' or 'down' arrow to cycle through time and minutes.

It should be appreciated that the default view may depend on the screen view and may be a function of display area.

Display birthdays from address book: checkbox—{default: on}. The calendar pulls the birthday dates from the address book and places those names and dates on the family calendar.

Display anniversaries from address book: checkbox—{default: on}. The calendar pulls the anniversary dates from the address book and places those names and dates on the family calendar.

Address Book

A configuration parameter to set address book display in fcApplication according to an embodiment is as follows:

User can set the sorting of the address book list: e.g. default setting is sort by {First Name, Last Name}. Alternate option is "Last Name, First Name."

Applications

This section provides a technique for third party applications to enter an application name and a link to a configuration page that displays within the frame of the fcApplication. In an embodiment, the fcApplication provides no unique logic for any of the application settings links; the third party application provides the logic.

The Settings Document may include a name and URL for each third party settings option that may be provided.

Application Name: Name of the third party application that is registered and creates a settings page.

Settings URL: The URL that the fcApplication must open and then display within the frame.

DECT Phone Feature Changes

In an embodiment, FC may require changes to the features displayed on the DECT phone. An exemplary DECT phone is discussed in the instant application's co-pending parent U.S. patent application Ser. No. 11/745,888, filed 8 May 2007.

Adding family member adds user account on DECT phone: When a family member is added through fcApplication it also generates a user account that is available through the DECT phone.

Remove Delete user Delete Option from DECT phone: In an embodiment, the preferred way to add/delete user accounts is through the fcApplication. The option to add/delete is removed from the DECT phone.

Remove user avatars from DECT phone and replace with login list: Because each family member may automatically be assigned a user account, there may not be enough space on the DECT phone display to present all the avatars. In an embodiment, present the login list and remove the avatar. In an embodiment, such technique includes removing the personal alert for Google's gmail and personal SMS.

Address Book

This section discusses and outlines fcAddress Book features and presentation within the web client, according to an embodiment. It should be appreciated that the particular details referred to hereinbelow are illustrative only and are not meant to be limiting. One skilled in the art could readily contemplate other elements or steps and still remain within the scope and spirit of the claimed subject matter.

Overview

The Address Book is displayed as a core application of the Family Center. The Address Book allows the user to access an address book and use it as their center of communications to initiate calls and messages and enhance existing applications.

It is assumed herein that features and functionality behaves substantially the same on the DECT phone service unless specifically noted otherwise.

General Layout

In an embodiment, the Address Book screen layout follows the paradigm of left navigation panel and the right main page view.

The left column panel provides quick access views of specific address book categories, and the categories are as follows:

Address Book: Provides a list of family address book entries and a list of accessible third party address books and access to the third party address book entries.

Favorites: Displays a user-selected list of favorite contacts and associated contact info, e.g. one of the following: mobile number, home number, work number, or email address.

Family: Displays all family member entries.

All: Displays all address book entries.

Groups: Provides a list of groups and the list of entries associated with those groups, for example, family, all, and custom groups.

Call Log, lists:

Recent Calls.

Missed Calls.

'Suggested' Address Books

Application may place links to business directories that a user may sign up and add as a 'group' under the Address Book category, e.g. SuperPages, Yellow Pages, White Pages, Schools, Religious Groups, Clubs, Soccer Team, etc.

In an embodiment, views, adhere to the following format, unless otherwise noted. The right main page is divided into two vertical sections and shows the list view of applicable individual entries, listed by names, with a persistent search box on top in the first section, and the selected detailed address book entry as defined by the selected quick access view in the second section.

Default view setting may be the 'Favorites' view.

Address Book

In an embodiment, the address book application provides a technique for accessing and viewing address book entries, and creates and manages address book entries. Below is a detailed description according to, but not limited to, an embodiment.

In the left pane, show the following address book views:
Favorites
Family
'All' Address Book
Custom Group1*
Custom Group2*
Third Party Address Book A (Access)*|This functionality allows users to access external on-line address books via the FC address book, but does not locally store the address book entries.
Third Party Address Book B (Imported)*|This functionality allows users to download external on-line address books to the FC address book, and locally stores the address book entries.
  It should be appreciated that groups denoted with '*' are created and managed by the user. See a detailed description below under 'Groups'.

Address Book Entry

'Add new contact' option appears in left panel column panel as '+'. The following fields are available to create a new address book entry:
First Name
Last Name
Title
Suffix
Company
Job Title
Home Phone
Home Mobile Phone
Home Fax
Work Phone
Work Mobile Phone
Work Fax
Other Phone Number
Home Address
  Address
  City
  State
  Zip Code
  Country
Work Address
  Address
  City
  State
  Zip Code
  Country
Home Email
Work Email
Birthday
Special Date:
  Anniversary
  Other
Group Association(s)
Group1
Group2
Etc.
Note:
  Provide ability to mark the entry and an associated contact number as a 'favorite,' e.g. both in list view and detailed view.
  'Note' field size may be 1000 characters.
Edit and Delete address book entries|User sees the option to 'edit' or 'delete' in the detailed view. After making edits, users can choose to 'save' or 'cancel'.
  User can designate an entry and contact number as a favorite.
User has the ability to initiate a call from address book entries.
  In an embodiment, FC communicates to fcApplication whether the family has a phone device, e.g. phone, registered with the family. When yes, then the entries of the address book include at least one dialable number field that when selected initiates a call through the registered device. When a device phone is not registered with the family, then the dialable number field is not present.
User has the ability to initiate a text message from address book entries.
Family Member Entries:
  Family member entries may look similar to that of address book entries, and may denote specific family member fields—first name, color, mobile phones.
  The user may click to go to Settings>Family Member Settings for that specific family member user to change configuration settings.

Search Address Book

In the right pane, Address book view has 'Search' on the top of the column that displays the address book entry list.
  List of Address book entries, e.g. alphabetical, may be displayed by 'Last Name, First Name'.
    Sort Display is changeable in 'Settings' to 'Last Name, First Name'.
  'Search' functionality|User may enter an alphanumeric string into the search box and the search results consequently display a list of address book entries that meet the search keyword. When a user selects an entry on the list, the details of that entry are displayed.
    In an embodiment, search may only search those contacts in that specific list view.
    Search may search first and last name, title, and company fields.
      Search may search all fields in an address book entry: phone number, groups, address, etc.
    Search results may be based on words or phrases that "contain" keyword/alphanumeric string, for example.
    In an embodiment, dynamic search is provided in which search results appear as user types in the keyword.

Sync

Sync|Ability to sync from a third party branded personal address book. User may configure the frequency of the address book sync.
  Manual|User may manually sync address book to a third party address book. User has Address Book linked to a third party address book and may click on a button to manually sync the address book.
  Automatic|Address book is synced automatically whenever a change is detected in the address book, e.g. new entry, deleted entry, and edited entry.

Examples of possible third party address books to sync include:

Plaxo, Google, Outlook, Yahoo!, Hotmail/MSN/Windows Live, .mac Address Book/Apple Contact Book, Facebook, AOL, LinkedIn, LDIF, and PAB, to name a few.

Import

Import|The user may import from a third party personal address book. User may select to manually import an address book from an external source, e.g. School, Church, Club, Soccer Team, etc.

Importing multiple address books does not delete existing entries nor does it delete previously imported entries.

It should be appreciated that if a user re-imports an address book from the same account, the application may be able to update existing imported entries.

General: CSV, text format, vCard, LDIF

Application may create a group and name it from the import file. If no name field exists, the group name may default to 'custom group' naming convention, e.g. as defined below in 'Custom Groups'.

Access to Third Party Address Books|A user may login and sign up for access to third party address books, e.g. School, Church, Club, Soccer Team, etc.

Application may create a group and name it from the import file. If no name field exists, the group name may default to 'custom group' naming convention e.g. as defined below in 'Custom Groups'.

User may need to input a login and password.

Favorites

In an embodiment, favorites are a user-defined list of frequently-accessed contacts and associated numbers, i.e. Mom (mobile), Dad (work), Ted (mobile), etc.

A favorite entry is the contact name and preferred contact number, e.g., mobile, and not the address book entry, e.g., Dad (mobile).

Address book entries may have a special user interface treatment in the list and the detailed view to identify them as favorites.

Add Favorite

User can assign a specific address book entry name and phone number as a favorite.

A user can identify multiple favorite entries for the same contact with different numbers, e.g. Dad (mobile), Dad (work).

User can drag and drop an entry into the favorites folder. If the contact has multiple entries, the user may be prompted to select one to add to the favorites list.

User can click on a '+add new' button which brings up a list of names and available phone numbers to select as a favorite. The user can select a name and phone number combination as a favorite.

Unassign Favorite

User can unassign a favorite from the favorites list.

Unassigning a favorite does not delete the address book entry.

Reorder Favorite

Favorites are displayed in the order that they are added to the favorites list.

User has the ability to reorder favorites.

Subsequent added favorites may be added to the bottom of the list.

Family member mobile phone numbers may automatically appear in the Favorites list. In an embodiment, causing phone numbers to automatically appear in the Favorites list is a server-based functionality.

When a family member is created, the associated mobile phone number is automatically placed into the Favorites list.

Once in the Favorites list, family members can be reordered or deleted.

Ability to initiate a phone call from favorite entry is provided.

Ability to initiate a text message from favorite entry is provided.

Favorites are also one of the criteria used to determine routing rules for messages. For example, FC system can be configured to display only messages from Favorites as tiles.

Groups

Group is a category classification for address book entries to help organize address book entries into more manageable and contextually-relevant views for the viewer.

Ability to view address books in groups is provided, for example, as follows:

Family: display family member entries only.

All: display all address book entries.

'Custom' groups.

Ability to initiate a phone call from group address book list and entries is provided.

Ability to initiate a text message from group address book list and entries is provided.

'Favorites', 'Family', and 'All' Group Folders cannot be edited or deleted.

Cannot delete an address entry for a family member.

A family member may need to be removed as a family member and then the address book entry can be deleted.

It should be appreciated that some devices may not have the capability to present the concept of 'Groups', such as, for example, on the DECT Phone.

Reorder Groups

Groups are displayed in the order that they are added to the list.

User has the ability to reorder groups.

Subsequent added groups may be added to the bottom of the list.

'Family' View

'Family' is a special type of group and supports the same functionality in groups and has the following functionality.

Family members are automatically assigned to the 'Family' group in an embodiment.

User can select a link to go to 'Settings>Family Members' to configure family members. See Settings section hereinabove.

In Settings: allow a user to create a custom family name within settings and then display the custom family name throughout FC.

No other entries can be added to the Family group unless they are designated as a family member.

Non-family members cannot be added to the family address book.

In an embodiment, family member entries may be denoted as family entries, but remain similar to all other address book entries.

An embodiment may include one or more of the following features:

Once an entry is no longer designated a family member, that entry is removed from the 'family' group. The address book entry remains in the address book.

User cannot edit group name nor delete the Family group.

The family group folder is named the 'family group' name as defined in the Settings; otherwise, the default name is 'Family'.

Family members' entries appear as other address book entries with the 'family' group assignment and assigned 'family member' color.

'Custom' Group View

According to an embodiment, a user can create 'custom' groups and manage their entries within these groups as follows.

User clicks on '+' to create a new group, and a new group appears in the list, with the title highlighted, thereby prompting the user to edit. Default name may be 'Group#' where the # represents a number that increases incrementally to avoid duplicate named groups.

User can Assign an Address Book Entry to a Group
    Assigning a single entry to a group:
        Drag and drop|User can select an address book entry from the list and drag and drop it into the desired group.
        Pull down menu|Users can, from the detailed address book, select from a pull down menu the list of groups.
    Assigning multiple entries to a group:
        User can identify multiple contacts and drag and drop into a group.

Edit Group
    User can change the name of the group. For example, the user may double-click on the name of the group, and edit. Hit <enter> to save changes.
    Change in name may appear in each associated address book entry.

Delete Group
    Deletes group affiliation with each associated address book entry.
    Does not delete address book entries.
    Provide option to delete group and address book entries in that group.
        In an embodiment, delete a group and associated entries may only delete those entries that are classified solely with that group. If an entry associated with the deleted group has multiple group associations, then the group association within that entry may be removed and the address book entry remains.

Importing into a Group
    User can select a custom group and select import. During the import process, the user may be prompted if he or she wants to import into that group or the general contact book.

Call Logs, Recent and Missed

Call Logs present a list of the most recent incoming, outgoing, and missed calls. The call logs may be arranged from most recent received to least recent received, for example.

It should be appreciated that, in an embodiment, the DECT Phone UI for call logs are defined. An exemplary DECT phone is discussed in the instant application's co-pending parent U.S. patent application Ser. No. 11/745,888, filed 8 May 2007. Thus, in this discussion hereinbelow, the following description applies only to the FC Application.
    Display list of Recent Calls: displays list of the last twenty Recent Calls, which include dialed, received, and missed.
    Display list of Missed Calls: displays list of the last twenty Missed Calls.
    Create and 'add to existing' entries from call logs, e.g. recent and missed.
    Number of calls is not configurable.
    User can clear 'all call' logs by clicking a 'clear all' button. Clearing call log clears call log for all devices.
    In an embodiment, the following features are provided:
    Ability to initiate a phone call from call log entry.
    Ability to initiate a text message from call log entry.

Application Features

Users can 'Create' and 'Add to Existing' Entries from Other Applications

The user can create a new address book entry or add to an existing entry from other features and services within the fcApplication. For example, users may receive a voicemail and text message and if there is no address book entry name associated with the number, the user can opt to click on an option to 'create' or 'add to existing' address book entry. The address book entry form pop ups and the user can enter the pertinent information. In an embodiment, such functionality is available from the following services:
    From voicemail application|User can click on the number and have the option to save to the address book.
    From incoming text messages|User can click on the number and have the option to save to the address book.
    From local directory searches|User can click on the number and have the option to save to the address book.
    It should be appreciated that this function may be available to other applications, as well.

Family Calendar

This section defines and describes a Family Center calendar features and functionality according to an embodiment. It should be appreciated that the particular details referred to hereinbelow are illustrative only and are not meant to be limiting. One skilled in the art could readily contemplate other elements or steps and still remain within the scope and spirit of the claimed subject matter.

Overview

The Family Center Calendar is an on-line scheduling tool for creating and managing a family calendar. It provides the tools for users to do the following:
    Enter in individual and family events as well as import and sync with third party sources.
    View, track, and manage group and individual family member events.
    Receive notifications of newly created events and receive reminders for upcoming events—on home-based and mobile devices.
    Create and manage tasks on an easily accessible to-do list.

In another embodiment, to-do list is functionally separated from and taken out of Family Center Calendar. In an embodiment, to-do list can be accessed by a top-level tab on the Home page. It should be appreciated that while the functionality of the to-do list is described in part as being within Family Center Calendar, one skilled in the art can recognize that all or part of such functionality is not limited to operating from within Family Center Calendar and can operate at a higher level, independent of Family Center Calendar.

Calendar Views

The calendar provides multiple views to achieve more granularity to better manage the family calendar. The views are split into two major groups: quick access items in the left hand pane and major views and navigation elements in the right hand pane.

Left Panel View|Navigation to Quick Access Views

In an embodiment, the left pane view provides access to different time-based views of the calendar. The left pane view may include any of:
    List View of a Day's Events
    To-Do
    Mini-Calendar List View of Day's Events
> Title of the quick view menu is displayed as "Day of the Week, Month-Day, Year".
> User may see a list of events displayed chronologically for that displayed day, such as from the earliest to the latest.
> Each event is listed with start time and title displayed with the associated participant color for the individual or family. It should be appreciated that shapes, such as triangles, squares, circles, diamonds, stars, and the like, may also be employed.
> Users can scroll down to see additional events for that day, if there is not sufficient space to list all events.
> To view lists for previous and next days, the user can click on navigation arrows near the title that changes the list view to the desired day.
> Event Details|User can click on an event, which may, have a pop-up window that displays the details of that event.
> User can click on a button to 'edit' or 'delete' events.
>> Edit|Once the user clicks the 'Edit' button, the user can edit the appropriate fields and then click on 'Save' to save changes or 'cancel' to cancel any changes.
>> Delete|Once the user clicks the 'Delete' button, the user is prompted to 'Confirm' deletion or 'cancel'.
> New Events|Clicking on the 'New Event', users may be prompted to enter in the details of the event.
>> The default day and time is that present day and time, e.g. if the date is Monday, Oct. 12, 2009 at 9 am, that data is pre-populated in the form for the user to edit.

To-Do List
A detailed description of the To-Do List can be found in the section of the same name hereinbelow.

Right Panel|Detailed Calendar View with Calendar Controls
Along the top of the right view, users may be able to control the calendar view by month and by week, by family members, navigate forward and backwards within the calendar, and perform basic calendar functions.

Calendar Function in Right Pane
> New event|Users can click on the 'New Event' button at the top of the page and begin adding details around a new event. See hereinbelow for detailed description about creating a new event.
> 'Today' button|Users can click on the 'Today' button and the view immediately renders 'today's' date within the selected calendar view.
> Switch Calendar Views|Along top, user can click on 'weekly' or 'monthly' buttons to switch from week to month views.
> Switch Family Views|Along the top, user can access a pull-down menu to filter weekly and monthly views for a specific family member or the entire family. Default setting may be 'all family'.
> Date selection and the List View|In the left hand pane, the list event view may pick the selected day in the week or month view. Default may be set to 'Today', and thus the left hand pane list view may display 'today's' list of events. If the user selects another day, the left hand pane list view may display that day's list of events.
>> Example: "Today's" Date is Dec. 5, 2009 and the list view shows all events listed for Dec. 5, 2009. The user selects Jan. 10, 2010. The list view shows all events listed for Jan. 10, 2010.

Display Calendar View by Week|the Right Pane Renders a Weekly View of the family calendar.
> View week format, 7-days, beginning on Sunday and ending on Saturday. Week title is displayed as "Month, Week Start Day-Week End Day, Year".
> Each day within the weekly view has the 'Day of Week, Month/Day' in the day title.
> Each day appears as a column with the time scale on vertical in ½ hour increments, as a default.
> View is scrollable with default day view beginning at 8 am and extend 10 hours without scrolling.
>> Day start and end time configurable within settings.
> The current day and time is highlighted.
> User can click on a day and time and that day and time slot becomes highlighted. It should be appreciated that the current day and time remains highlighted and differentiated from selected day.
> User is able to scroll through weeks by clicking a navigation element next to the week title.
> Each event shows a block that begins with the start time of the event and ends with the end time of the event. In that block, user may see the event title, location, and participants. If there is not sufficient space within the block to display all text, the end of the text displays a 'more . . . ' to indicate more details within the event.
> User can click on an event and a pop-up window displaying the details of that event appears.
>> Within the detailed view, user can select to edit or delete the details of that event or close the details pop-up. See Event Details hereinabove.
> Clicking on the 'New Event', users are prompted to enter in the details of the event.
>> If no day and time has been selected by the user, the default day and time is that present day and time. For example, if the date is Monday, Oct. 12, 2009 at 9 am, that data may be pre-populated into the form for the user to edit.
>> If the user has selected a day and time, then the form may be pre-populated with the selected day and time, with a ½ hour duration time slot.

Display Calendar View by Month
> Users are able to view the entire month.
>> If necessary, the calendar displays the last few days of the end of the previous month and the first few days of beginning of the following month, in order to display entire month.
> The month title is displayed as "Month, Year".
> Users are able to click on a navigation element next to the month name to navigate forward and backwards to previous and subsequent months.
>> Users can click on a top navigation element that represents the different months that a user can click on to jump from one month to another. For example, Jan, Feb, Mar, . . . , Oct, Nov, Dec, or J, F, M, . . . O, N, D; also users can use the numbers 1-12.
>> To navigate around years, an arrow is displayed at the end of the navigation string, e.g. Dec, and then an arrow to indicate the jump to the next year, with the year 2010 showing next to the arrow. If the user clicks on the arrow, then the new view shows the month view from Jan to Dec for the next year.
> Within each day of the month, the title of the event and associated start time of each event are displayed.
>> Month View|If there is no useful text within the month view, then a vertical bar with the color of the family member that has an event for that day is presented. For clarification, the family member associated color bar may appear if that member has, as event that day, regardless of the number of events. If that member has multiple events, only one bar shows.
> User can click on an event, which causes a pop-up window showing the details of that event to display.

Within the detailed view, user can select to edit or delete the details of that event or close the details pop-up. See Event Details hereinabove.

Clicking on the 'New Event', users are prompted to enter in the details of the event.

If no day is selected by the user, the default day and time is that present day and time. For example, if the date is Monday, Oct. 12, 2009 at 9 am, that data is pre-populated in the form for the user to edit.

If the user has selected a day, then the default day is the selected day, and the default time is the present time.

Display Calendar by Family Member, e.g. Color

Family view controls may need to be scalable to account for increasing number of family members.

In addition to the 'All Family' view, a user may select a filtered view of each family member's individual calendar.

Family member views are available in each view format: by week, by month, and in list view.

Individual family member views may include shared family events.

Individual family member events are distinguished on the calendar with the family member's color.

Default View in an embodiment is the Calendar view by Week and view by all family members with "Today's" date is the default view, which is highlighted.

The Calendar automatically accounts for leap years and uses the system zip code to determine the time zone.

Entering a Calendar Event

In an embodiment, users can enter events via four methods. One skilled in the art can readily appreciate that such methods are by means of illustration and are not meant to be limiting. Other methods may be used that are within the spirit and scope of the claimed subject matter. The methods are described in further detail hereinbelow.

Form Entry|Users can enter the event information into a form format by clicking on 'New Event' button, as described above in the List, Week, and Month Views.

Send and receive event information from a third party calendar, such as Microsoft's Outlook.

Importing Events from third party calendars.

Natural language parsing|User may type in a keyboard or recite by voice a phrase in natural language form that is then parsed for event-related information. For example, a user may type in the phrase, "Kendra has a doctor's appointment at 2 p on Thursday" which is then parsed and entered into the calendar as an event.

Form Entry

Users can enter the details of an event by filling out a form with predefined field designations. The user is not required to fill out all the fields of the event form. The date and time are pre-populated, as defined by the context above, and defaults to <all family> members as participants. If no fields are populated other than the date and time and the default <all family> members, then no event is created.

Title of Event|A user can enter in text to describe the event.

Date of Event|A user can enter the Date and Start Time (HH:MM AM/PM) for the event. He can select to edit the End Time (HH:MM AM/PM) or the Time Duration of the event, e.g. the hour and minute duration, which automatically calculates the end time.

To select a date, the user can click on a small calendar icon and see a pop-up month and select a new day. The user can also scroll to different month views to select a day.

"All Day" Event: A user can mark a checkbox to select the event as an 'all-day event', which may not have an assigned time duration or start and end time, and creates a heading at the top of that specific day. An "all-day" event appears as a header in weekly view, bolded in the list view and month view.

Recurring Event: The user has the option to identify the event as a recurring event with the following options:

Daily: SMTWThFSa|User can select any single day, e.g. every Tuesday or multi-day recurrence, e.g. weekdays, every Monday and Wednesday.

Weekly|User can select recurrence to be every week on the same day and time.

Monthly|User can select recurrence to be every month on the same day of subsequent months.

Annually|User can select recurrence to be every year on the same day of every subsequent year.

User can select an event (a) to recur a specific number of times, (b) to a specific end date, or (c) to continue in perpetuity.

Location|User can use this field to manually enter a location name or an address into this field.

User has the option to click on a button to access the family address book and find a name with an address attached to it. Selecting the name and/or address, if multiple addresses exist, populates the address into the location field.

If an address is entered into this field, the address appears as a link and the user can click on the address and see a pop-up map with the location mapped out with the option of getting driving directions from their home address as the starting point.

Participants|The user can select an individual family member to assign an event.

Family members show up in a list with checkboxes and with an additional 'all family' checkbox.

Default setting is to 'all family members' unless otherwise specified, i.e. specific family members are chosen. By selecting a specific family member, the default of 'all family' is unchecked. An event can have <all family> or one or multiple individual member assigned to an event.

In settings, family members can select to have event notifications and reminders sent as a text message.

For clarification, notifications are for event invitation, updates, and cancellations and reminders are for event reminders. Notifications appear only as text messages and Reminders appear as both text messages and tiles.

Family members can select to have invitations and reminders sent as emails in addition to text messages.

In settings, the notification and reminder setting controls are as follows: Individual family members have the option to receive (a) all notifications and reminders (b) notifications and reminders addressed to the user, including family notifications and reminders, and (c) no notifications and reminders.

Notes/Description|User can add additional notes into a general text box.

Event Reminder Configuration|User can configure the event reminder option.

Day Before Event Notification: Calendar sends out a tile and text notification at 6 pm the day before the event. The time is adjustable in hours:minutes pm/am. A checkbox exists to opt-out of the notification. It should be appreciated that the opt-out applies to text and tile notifications.

Before Event Notification: Calendar sends out a tile and text notification 30 minutes before the event. The 30 minute time frame is adjustable in hours: minutes. A checkbox exists to opt-out of the notification. It should be appreciated that this opt-out applies to text and tile notifications.

Special Event Configuration|User can designate an event as a 'Special Event', which creates a different reminder plan.

Within the event details form, user can click a field to designate that event to be a 'special event', at which point, the details page expands to reveal additional notification, configuration options. See hereinbelow for specifics on notification and reminder requirements, according to an embodiment.

Moving Events

A user can move an event by clicking on the details of an event and edit the date and/or time of the event.

A user can 'drag-and-drop' an event from the list view to another day in the month or week view.

"Sync" Outlook Calendar Events and Family Calendar

A user can "sync" events between his Family Calendar and his Outlook account. This "sync" functionality allows the user to keep both his personal/professional calendar and his family calendar coordinated and separate.

When a user is on his Family Calendar account, he can configure his Calendar settings to automatically add family events to which he is invited, both individual and family events, to his personal calendar. Similarly, when a user is using his personal calendar and creates an event, he has the option to include the event and populate his individual family member calendar within the Family Calendar.

Any changes to an event, such as edits and deletion or cancellation of an event, appears in both calendars that are updated in real-time, e.g. after the edit is made in one calendar and saved, the other calendar is notified and makes the appropriate changes in its calendar. The goal is to have the events designated to be shared on the family calendar be coordinated with the user's Outlook calendar. It should be appreciated that based on technical implementation, the features/UI may change.

When in the Family Calendar, a user can set an option within his settings to automatically add all events on his Family Calendar View e.g. the events in which the user is a participant, to his Outlook calendar.

When in the Outlook calendar as the user is creating or editing an event, a user can include the Family Calendar email address as an invitee. When that event is create or updated, those changes are made in the corresponding event in the Family Calendar.

The user can edit any field of the event in Outlook or in the Family Calendar and the change is updated accordingly in both calendars.

If the user deletes the event in Outlook or in the Family Calendar, the event is deleted in both Outlook and the Family Calendar.

Refer to the Settings section for detailed account information for enabling sync, such as possibly login name and password.

Import Events from Third Party Calendars

A user can populate his Family Calendar with events from his personal calendar or calendars from other sources such as schools, sports teams, clubs, and other organizations. This feature is a one-way import.

According to an embodiment, there are two ways to import a file. A user can click on 'import' from the calendar view and be prompted to either (a) select a third party provider, e.g. Outlook, Plaxo, Google, Yahoo! or (b) select a file to import. It is contemplated that different formats are supported as support becomes available for ensuring growth and scalability.

Import from a brand third party calendar service. If the user selects option (a) a third party provider, the user is prompted to enter a login name and password. The user's login name and password is not saved and is not prompted again when the user chooses to import a calendar again.

Import calendar events from generic files. If the user selects option (b) a file, the user is prompted to select a compatible file from a drive. The user is then prompted to select a family member calendar to which to import those events, with 'all family members' as an option as well.

Example calendars may include: Google, Plaxo, Outlook, Yahoo!, Windows Live/MSB, .mac, and CalDAV.

Formats may include: CSV, Excel, text.

Users can import a standard U.S. holiday schedule and have the schedule displayed on their family calendar.

Import Wizard: Importing a calendar is manually performed on a case-by-case basis. User can click on a button to import another calendar. A wizard appears, which guides the user through the import process, including matching the imported calendar to a personal account. In the beginning, the user selects from a list of possible third party providers, see examples hereinabove, and enters in the pertinent data, e.g. login name and password. The user is then prompted to import calendar events. Upon completion, the user sees a completion screen and then exits the wizard.

Subsequent imports: when a user imports from the same calendar source multiple times, the import process recognizes previously imported events and edits/deletes those events accordingly. Suppose, for example, in Google calendar, the user imports his personal calendars and then an event in the Google calendar changes, e.g. moves or deletes. When the user imports his Google calendar again, those changes appear in the updated import.

Notifications

Event Notifications—Creation, Update, and Deletion Notifications

To help family members coordinate and stay updated, the calendar sends notifications to configured family members via text message upon the creation, modification, and deletion of an event. No tile is created.

Create and Update Notification: If the user creates or updates an event, the calendar sends out a text message to participants.

Delete Notification: If the user confirms deletion, the calendar sends out a text message to participants that the event has been cancelled.

Refer to Settings section hereinabove: In the overall calendar settings, a user can configure to receive text message notifications for all family members, the individual family members, and none.

It should be appreciated that these same settings cover event reminders as well.

Event Reminders—Tiles and Text Messages

The Family Calendar pushes a 'tile' notification to the home screen before the event, as defined by the event notification configuration hereinabove, and sends a text to participating family member(s).

The notification tile contains the title, time, location of the event, and participant name, or 'all family'. When the user clicks on the notification, the user sees details of the event.

See Tile section hereinabove for specifics details about the Tile.

Special Event Notifications—Tile and Text Messages

The Family Calendar provides an added feature in notification and support for special events such as birthdays and anniversaries. For example, a user can designate an event as a special event within the event details as a checkbox and the application sends a countdown tile notification to the home screen and sends a text message and email at one or more defined time periods to periodically remind the family of the upcoming event. It should be appreciated that special events can be edited the same as a regular event, but the user sees additional configuration options for special events.

> Countdown Tile|The family application sends a countdown tile to the home screen. By default, the countdown tile appears, begins two weeks before the event, and decreases one day at a time until the day of the event. If the countdown tile is dismissed from the home screen, then it reappears the next day.
>> Countdown Tile Configuration|Within the details of a specific special event, the user sees a checkbox to turn on or off the reminder. Default is set to on. The user can also change the day of the first notification from its default setting of fourteen (14) days before the event.
>
> Text Message Reminders|The family application sends out multiple reminders via text message and emails at the following predefined intervals: two weeks before the event, a week before the event, three days before the event, the day before the event, and the day of the event. Reminder time periods are configurable and the defaults are as outlined above.
>
> Birthdays|The family calendar can pull the birthdays from all entries in the address book and populate the family calendar appropriately. These events are populated with the default notification settings and created as annually recurring events.
>> Within the settings, the user can 'uncheck' a box to toggle having the family calendar populated with birthdays.
>> Birthdays are posted to the 'all family' calendar.
>
> Anniversary|The family calendar can pull 'Anniversary' date and populate the family calendar appropriately. These events are populated with the default notification settings and created as annually recurring events.
>> Within the settings, the user can 'uncheck' a box to toggle having the family calendar populated with anniversaries.
>> Anniversaries are posted to the 'all family' calendar.

Calendar Storage

In an embodiment, the family calendar stores event information for each family calendar for three (3) years past and three (3) years forward from the present year.

Calendar Personalized View

In an embodiment, Calendar can create a personalized calendar view for an individual within the family. For example, Dad can register a third party application, e.g. his iPhone, with FC system and indicate that he desires to have a personalized calendar view. For example, he may select a box that then causes the personalized calendar view functionality to apply his calendar-related events. Thus, after registering the iPhone with personalized calendar view turned on, Dad then receives only those calendar events that are marked for the family or for Dad. It should be appreciated that choosing a personalized calendar view may appear as the opposite feature of a user publishing events from his or her personal calendar to FC system. It should be appreciated that by way of personalized calendar view, the user, e.g. Dad, can manage his or her calendar from his or her device, e.g. from third party iPhone application, and FC system synchronizes such third party calendar application with his or her personalized view of the FC calendar.

Local Directory Search

This section describes Local Directory Search (LDS) Features and Functionality according to an embodiment. It should be appreciated that the particular details referred to hereinbelow are illustrative only and are not meant to be limiting. One skilled in the art could readily contemplate other elements or steps and still remain within the scope and spirit of the claimed subject matter.

Overview

The FC Local Directory Search (LDS) provides users with a local search resource to find local businesses and services and it becomes their default family 'yellow pages'. Integrated with enhanced functionality, such as click-to-call and mapping, the Local Directory Search is a powerful directory search tool that allows users to quickly fulfill their local search needs.

It is contemplated that LDS may provide additional features such as recommendations, personalized offers, and coupons together with on-line advertising, e.g. banner ads and sponsored links.

Local Directory Search View

LDS follows the existing view paradigm wherein the left pane creates quick access to links that expedite the search process for popular and recent searches. The right pane allows the user to conduct a more detailed and customized search with enhanced search result listings and details.

Left Pane Quick Access View

The left pane quick access provides a listing of quick links to popular searches, recent searches, recommendations, targeted offers and coupons.

> Popular Searches|Provides a list of the most frequently searched categories as defined by a designated search provider. This list can be pushed to all users, for example, on a periodic basis, e.g. weekly, monthly, or quarterly.
>> When the user clicks on one of the popular search links, the right pane displays the search results as a function of family's default settings. For example, the user sees pizza in the popular search listings and when the user clicks on 'pizza', the search function results in finding and presenting the pizza locations closest to the family, based on the family's default zip code location.
>> The search location defaults on the system zip code, unless otherwise define in the FC settings. Refer to Settings section hereinabove.
>> As another example, the following list may be a current list of popular search categories:
>> Restaurants|Pizza
>> Restaurants|Chinese
>> Restaurants|Italian
>> Restaurants|Mexican
>> The user can scroll down within the view to see additional categories, if available.
>> In an embodiment, such list is updated on a periodic basis and provided by a designated search provider.
>
> Recent Search Results|The FC or fcApplication saves the last number of searches, e.g. saves the last ten searches, and displays this list of searches from the most recent to the least recent. The user can select one of the links and the saved search results listing appears in the right pane.

Once a link is selected, that particular search moves to the top of the most recent position in the 'recent searched' list.

Recommendations, Targeted Offers, and Coupons|It is contemplated that recommendations, targeted offers, and coupons are pushed to families.

Saved Searches|Users are able to save a search result detail, e.g. the particular search query, or search for a reference at a later time.

Right Pane View|Search Box and Search Results

The right pane provides the user the UI to perform a local search. In the right pane, a persistent search box, the default search start page, search results, and search details are displayed.

Search Box|On the top of the right pane view, there are two search boxes that are available from every view within LDS. The first box is an empty search box where a user can enter a keyword, e.g. category, business name, or address. The second box positioned next to it defines the search location parameter and is pre-populated with either the family's default home address, if available from the home address entry in the administrator's address book entry, or home zip code or city/state, as defined by default system zip code.

User can enter a business name, category name, or other keyword to conduct the search.

User can change the location by entering the desired target address, city, state, or zip code.

Search Navigation|Users see a 'Breadcrumb' navigation theme to return to the search 'home', previous categories, sub-categories, and search results along the top of the search results listing. These navigation elements are visible from the initial search page and search results listing. In an embodiment, such theme is not applicable in a search result detail page, when the search result detail page it is a pop-up window.

The user may see between the search boxes and the top of the categories, search results, or the search details, such line of text ("breadcrumb") with separate links that, when clicked, bring the user back to that page. The format of the breadcrumb follows this format: "Search Home>Search Results>Search Details".

The user also sees an arrow navigation element to move forward and backwards through previous and subsequent search pages. The arrows appear below the search boxes and above any of the detailed pages, such as categories, search results, or search details.

When navigating to previous pages, the application remembers the search term and targeted location and keep those elements pre-populated in the appropriate fields.

Default Right Pane Search Screen|The default view in the right hand pane provides a directory structure search below the search boxes and navigation elements and lists the major category and sub-categories. The user can click on a category or sub-category and see a listing of businesses and services under that category as defined by the search location parameter.

Directory Category and Sub-Category|The following list is a sample listing of categories and sub-categories, which may be configured by the search provider. Such list is for illustrative purposes and is not meant to be limiting. The list of categories and sub-categories are subject to change and can change at any designated time, such as periodically:

Arts & Entertainment
Bars, Concert Tickets, DVD Rentals, Movie Theaters, Night Clubs, Sport Tickets, more . . . .

Auto
Auto Glass Repair, Auto Parts, Auto Repair, Car Rental, Car Sales, Tires, more . . . .

Dining
Chinese Food, Italian Food, Pizza Delivery, Seafood Restaurants, Steak Houses, BBQ, more . . . .

Beauty/Personal Services
Beauty Salons, Day Spas, Health Clubs, Manicures, more . . . .

Education
Beauty Salons, Day Spas, Health Clubs, Manicures, more . . . .

Business and Professional Services
Employment, Employment Agencies, Home Security Systems, Temporary Jobs, more . . . .

Health & Medicine
Dentists, Doctors, Pharmacies, Dental Insurance, Drug Treatment Centers, more . . . .

Home & Garden
Hardware stores, Landscaping services, more . . . .

Computer & Electronics
Computer Repair, Internet Service Providers, more . . . .

Real Estate/Moving
Apartments, Home Inspection, Mortgages, Real Estate Agents, more . . . .

Search Results

In an embodiment, search results requirements fall into two categories: the search results page and the details of a specific search result.

Search Results Listing or Page

The search results page displays the list of search results based on the user's search keyword and defined search criteria. In addition, this page may render sponsored links, positioned within the search results page and visibly distinguishable from the search results.

Display List of Search Results

Following are sample examples of criteria for displaying a list of search results, according to an embodiment:

Search results display in a list of ten entries.
User is able to select from a pull down menu the number of search results per page. Display the option of 10, 25, or 50 entries per page.

Results are, by default, displayed by distance, e.g. from the closest to the furthest from the inputted location.

At the top and bottom of the search results page, the user can click on the next or previous search results page or click on a specific page number to jump to that page.

Each search result listing contains the business names, ratings, logos, distance from the search location and first couple of lines of description of each business, if applicable. Each of these elements may be a detail header for each listing. The user can click on a header to sort by that criteria. See hereinbelow for sorting requirements.

When the user clicks on a search result listing, a pop-up view appears that contains the details of the entry. See Search Result Detail hereinbelow.

User can sort results by distance, by ratings, and alphabetically. List is sorted by distance, by default, from closest to furthest. To sort, the user can click on the relevant header title.

Sort by Distance|Default setting is 5.0 miles from the entered location. When sorting, sort by distance defaults from closest to furthest. A subsequent click reorders the list from furthest to closest and back again.

Can filter results by 0.5 miles, 1.0 miles, 5.0 miles, 10.0 miles, 15.0 miles, 20.0 miles, 25.0 miles, 50.0 miles, or 100.0 miles.

Sort by Rating|User can sort results by all, 5 stars, 4 stars, 3 stars, 2 stars, 1 stars, or no stars. The first click orders the results from 5 stars to no stars, and subsequent click orders the results from no stars to 5 stars.

Sort Alphabetically|User can sort results based on business name from #A-Z, Z-A #. The first click orders the results from # to Z and the subsequent click orders the results from 5 stars to no stars.

Filtered Results

Filter results by Ratings|Users can filter results by ratings, from highest ratings to no ratings and from no ratings to highest ratings.

User can select to filter results by the following criteria: all, 1 star and above, 2 stars and above, 3 stars and above, 4 starts and above, or 5 stars.

Filter results By Distance|User can filter results by narrowing results to different search radius, with the defaults being the following: 0.5 miles, 1.0 miles, 5.0 miles, 10.0 miles, 15.0 miles, 20.0 miles, 25.0 miles, 50.0 miles, or 100.0 miles Sponsored Links|Advertising In an embodiment, three contextually-relevant sponsored links, e.g. paid search links, appear after the top three search results. UI treatment of the presentation or functionality of sponsored links clearly distinguishes the sponsored links from the search results.

Search Results Details

Click on search result listing to see a pop-up window to provide entry, e.g. business, details.

The details of the entry have the name of the business, the logo, and ratings with a full description of the business, address, phone number, and link to the website.

Clicking on a search results details link counts as a click and is tracked for reporting purposes.

Details may have other business-related information, if available, such as hours of business, reviews, a link to a map, and other suggestions and recommendations.

Users can initiate a call by clicking the phone number.

Track as a click to call.

Users can click on a link and add the business to the FC address book.

Links to websites|Users can click on a link to start a browser session that displays the business website.

Track links to website clicks as a 'click thru'.

Maps/Driving Directions|users can click on a link to get a driving directions link to a selected business.

The ability to print details of a selected search result is provided.

Figure 11:
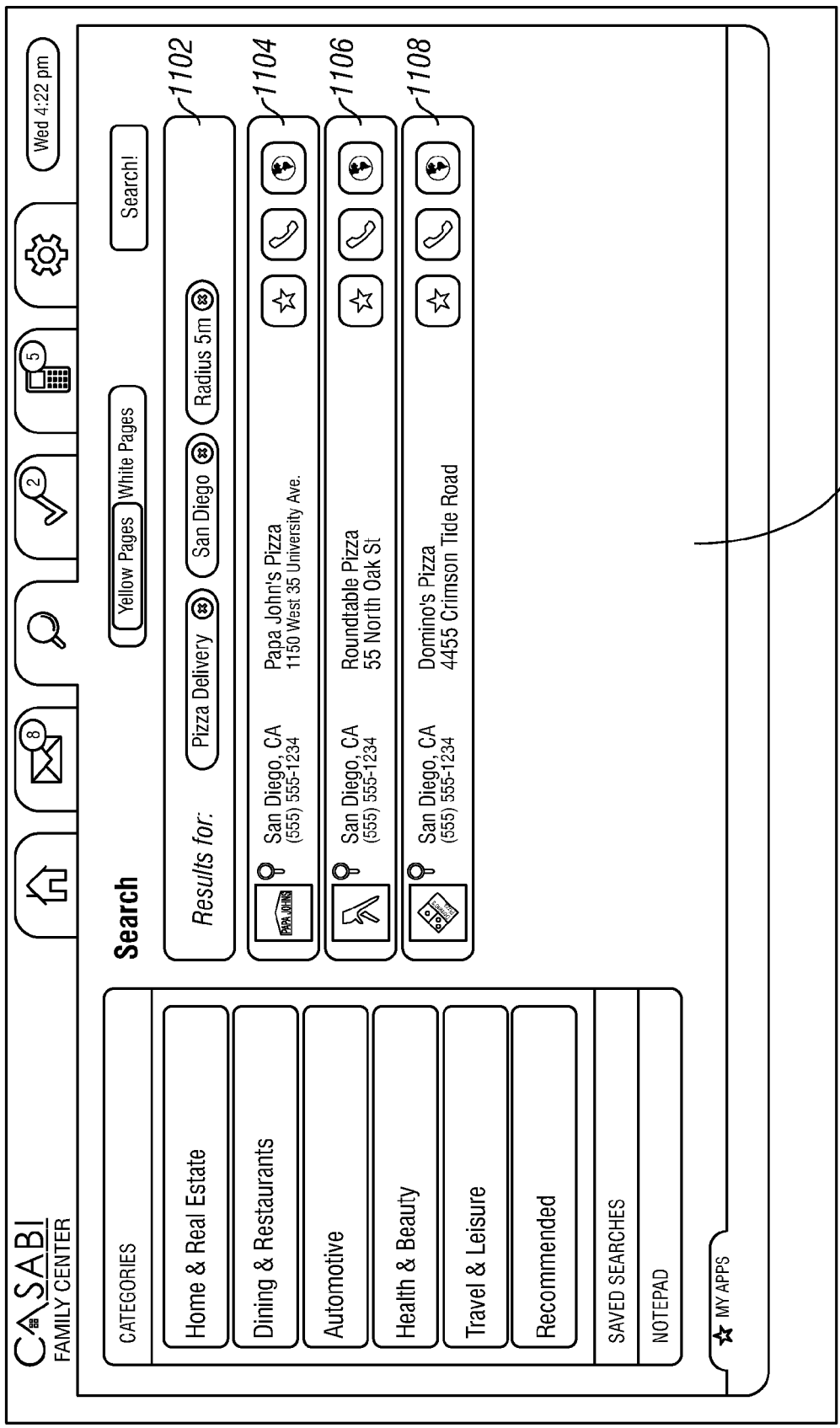
FIG. 11 is a screen shot of a family center search results view according to an embodiment.

An example of a search results screen shot can be found in FIG. 11. FIG. 11 is a search results view 1100 of the client application and shows categories, saved searches, and notepad options in the left pane. The right pane shows search results for "pizza delivery," "san diego," and "radius 5 m" 1102. Three items, each representing a particular pizzeria, are displayed. The first item 1104 represents Papa John's Pizza, the second item 1106 represents Roundtable Pizza, and the third item 1108 represents Domino's Pizza. It should be appreciated that each of the items show a phone icon whereby a user can click the phone icon and initiate a phone call to the particular pizzeria.

Advertising

It is contemplated that the FC Local Directory Search supports on-line advertising and provides a portfolio of advertising products from standard ad vehicles, such as banner advertising, to the ability to support features such as 'click-to-call'.

Advertising Products

Following is a list of sample criteria for handling advertising products according to an embodiment.

Banner Advertising on the default right pane view is provided.

The system pushes a banner in the main view between the search box and the business categories.

Refreshes on every new page view, including refreshing the page, itself.

Sponsored Links on search results pages is provided.

Click to Call on search result listing entries and search detail pages is provided.

Click to website on search result listing entries and search detail pages is provided.

Recommendations, Coupons and Offers are provided on the left pane.

Support for Tracking

The following features provide tracking ability:

Impressions|Ability to track impressions.

Click-thrus|Ability to track click-thrus on sponsored links, banner ads, and other forms of advertisement.

Click to Calls|Ability to track the calls made via a sponsored Ad.

Messaging Inbox

This section describes and outlines messaging inbox management and associated messaging features for voicemail, family messaging, and text messaging according to an embodiment. It should be appreciated that the particular details referred to hereinbelow are illustrative only and are not meant to be limiting. One skilled in the art could readily contemplate other elements or steps and still remain within the scope and spirit of the claimed subject matter.

Overview

The inbox is the central FC messaging hub wherein users can retrieve messages, e.g. voicemail, family messages, and text messages, manage their inbox, and initiate new messages.

It should be appreciated that incoming text messages are open to family members within the family.

General Inbox View

In an embodiment, the Inbox screen layout follows the paradigm of left navigation pane and right full screen layout.

Left Pane Main Categories are as Follows:

General Inbox|Displays all messages, e.g. voicemail, family, and text, in the right pane view. It should be appreciated that such view is the default view in an embodiment.

'Read' and 'Unread' icon to distinguish between 'read' and 'unread' status for all message types is provided.

Message type Icon: A different icon to represent each message type is provided.

Display the number badge for unread messages in the Inbox tab on top tabs and in the General Inbox view in the left pane. The number represents the sum of all unread messages.

It should be appreciated that the General Inbox has a different UI treatment than the other messaging inboxes to clearly identify it as the aggregate inbox.

Voicemails|Displays only read and unread voicemail messages in the right pane view.

Voicemail Inbox shows a number badge to indicate the number of unread messages in the left pane view.

Family Messages|Displays only read and unread family messages in the right pane view.

Family Message Inbox shows a number badge to indicate the number of unread messages in the left pane view.

Text Messages|Displays only read and unread text messages in the right pane view.

Text Message Inbox shows a number badge to indicate the number of unread messages in the left pane view.

Figure 10:
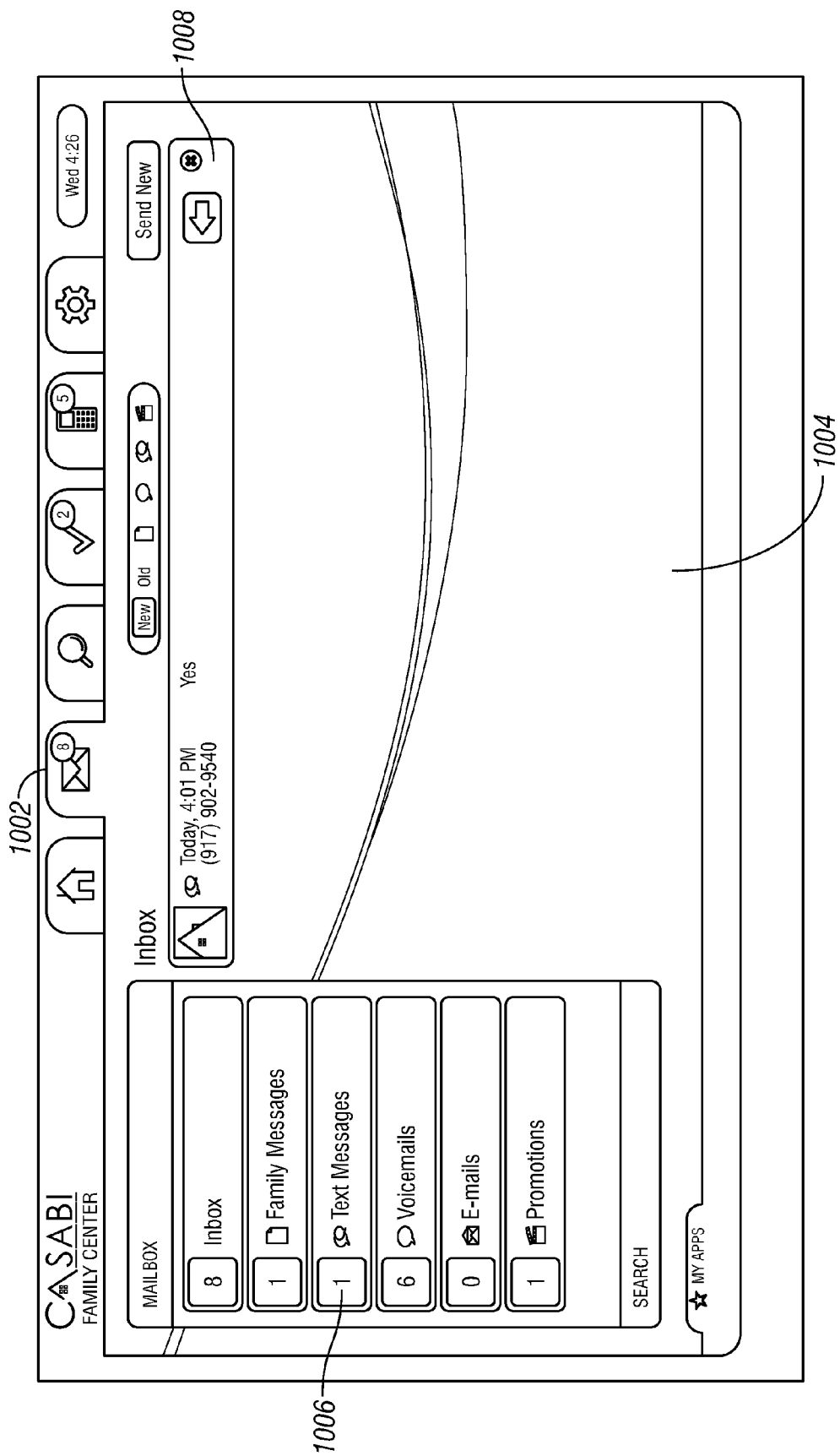
FIG. 10 is a screen shot of displayed text message detail within the family center application according to an embodiment.

An example screen shot of displaying text message detail within the family center application can be found in FIG. 10. FIG. 10 shows that a message tab 1002 is highlighted to indicate that the view is a message view 1004. The left pane of the view shows that a text message category 1006 is highlighted. Highlighted text message category indicates that the right pane is showing text message details 1008.

Right Pane View shows the list of messages and messaging functionality, such as 'new', 'delete all', 'sort'.

Displays list of all messages, e.g. 'unread' and 'read', all message types, sorted with the most recent on top.

When a specific message type view is selected, the list is filtered and displays only messages of that selected type, e.g. when a user selects 'voicemails', displays only voicemail messages. See hereinbelow for more details on specific functionality by message type.

Click on a 'New' button to create a new message. The 'New' button is located along the top of the right pane view.

If within General Inbox or Family Message Inbox, clicking 'New' defaults to 'send family message' and user may need to select 'New Text' to compose a text message.

If within Text Messaging Inbox, clicking 'New' defaults to 'send text message' and user may need to select 'New Family Message' to compose a family message.

To generate a new family message, the user selects 'Sender' and then types message.

In the body of the family message, the first name of the sender appears and then the body of the message to indicate to the recipients who is the sender. A suggested format is as follows: "<sender name>: <text>", e.g. "Dad: Dinner at 6 pm." It should be appreciated that in an embodiment, the characters in the given name count against a maximum number of allowed characters, such as the 160-character limitation.

To generate a new text message, user selects addressees and then enters message.

When selecting addressees, user can either enter the phone number, select from Favorites, or select from Address Book.

Dynamic Fill for Addressing|When entering in a name or phone number, a dynamic list is generated from which the user can select. In an embodiment, the list may default to mobile phone entries listed first. For number entries, the name of the person and the phone numbers with label, e.g. mobile, home, or work, appears below from a selection. For name entries, a list of names and associated phone numbers, starting with mobile phone numbers, is displayed.

As the user enters the message for both family and text messages, he sees a UI element that provides feedback on current character count. For example, the UI element is just below the message body field and displays "# of characters used/# of characters total (160 ch)". UI may display such character counts in all composition screens.

Click on a 'Delete All' button to delete messages.

When in a specific message type view, 'delete all' deletes only messages of that message type. For example, in the voicemails message type view, 'delete all' deletes all voicemail messages.

Ability to sort messages within each inbox view is provided.

Sort by Timestamp, e.g. from most recent to least recent or from least recent to most recent, is provided and is the default is an embodiment.

Sort by Sender Name is provided.

Sort by Message Type, e.g. Voicemails, Family Message, or Text, when in General Inbox, is provided.

User has the ability to batch process a 'delete' operation.

In an embodiment, a user can click a checkbox next to any message and click 'delete' to conduct a batch process 'delete' operation.

When such function is implemented, it is contemplated that the UI is integrated with the 'delete all' function.

Voicemail Inbox

In an embodiment, Voicemail Message displays the following: Sender Name, Date and Time, Length (min:sec), 'PLAY' button, and 'delete' button.

User have the Ability to Perform the Following Functions in Each Voicemail Message:

Playback Controls: Play, Pause, Forward, Back.

Delete.

In the Voicemail Inbox View, Users have the Following Options:

Play 'unread' Voicemails, which plays the voicemail messages from least recent to most recent. Plays in subsequent order without stopping.

Family Messaging

In an embodiment, family messages get created and posted on all connected devices and forwarded to configured family member cell phones as text messages.

Likewise, a text message from a configured family mobile number generates a family message.

When a user sends out a family message, that user is not designated to be a recipient of his or her own family message. The following conditions also apply:

When a user sends out a family message, the application prepends the name of the sender. In an embodiment, the application determines the number of characters in the name and subtracts that number from the available character count.

It should be appreciated that text messages that are sent from a family member's mobile phone, which are, by definition family messages, and that exceed the 160 character limitation including the sender's name prepended, are truncated to comply with the maximum number of characters allowed.

In an embodiment, family message functionality support is provided for, but not limited to, family devices such as FC application and the exemplary DECT phone, as described in the instant application's co-pending parent U.S. patent application Ser. No. 11/745,888, filed 8 May 2007.

In an embodiment, family message communication can be done through a dedicated telephone network (TN) for the family or through a shared TN for multiple families. FC supports either mode. For example, when a family purchases the FC service with a dedicated TN then all family messages are sent through that TN.

In an embodiment, FC system can virtualize family messaging for multiple families behind a single TN. Thus, many to many communication is provided by FC. Many to many communication is achieved by FC system grouping members of a family by the mobile TN of each family member. Thus, when a SMS message is received on the shared TN, the source of the SMS is checked. If the source matches a mobile TN configured within FC for any user, the SMS is treated as an incoming family message for the family where the mobile TN is a member. Thus, the family message/SMS is resent only to members of that family. This feature allows a single TN to be used as a virtual TN for inter-family communication. In an embodiment, such functionality is performed by the FC system and service and is transparent to users.

Put another way, FC system manages multiple group SMS communication through a single TN. FC system keeps the messaging straight by comparing the incoming TN on the SMS message to existing defined groups. If a match is found then the message body is sent back out only to the other members within the group. In this embodiment, any need to have a dedicated TN for each family when doing SMS family messaging is removed.

Family Message List View

In an embodiment, a family message displays the following items: sender, date and time stamp, text of message, 'delete' function, and 'send again'.
- A user can click on 'send again' function to resend the message. When the message is sent again the message TOD parameters are updated.
- A user can delete a family message from the list view.
- Clicking on a family message expands the message to reveal message details.
- Configuration settings to determine which cell phones receive family messages are provided, e.g. settings in family. See the section on Settings hereinabove for details.

Text Inbox

In an embodiment, each text message thread displays the following: Sender, Date and Time Stamp, Text of most recently received text in the thread, and ability to 'delete', 'reply', and 'forward'.
- A single click on the thread displays the entire thread.
- Each text message contains Date and Time stamp within the thread.
- A user can conduct the following functions from the list view and within a thread:
  - Reply to a Text Message|User can reply to the sender of a text message. Also:
    - User can add additional addressees and each response creates a separate thread.
    - When designating address of the recipient, user can enter the phone number, select from Favorites, or select from Address Book.
  - Forward Text Message|User can forward a text message, which includes the body of forwarded text message, and edit the body of the text before sending
    - User can add additional addressees and each response creates a separate thread
    - When designating address of the recipient, user can enter the phone number, select from Favorites, or select from Address Book
  - Delete Text Message Thread|User can delete individual threads, such as a single text message thread.

To-Do's

This section describes, including defines, the To-Do List features and functionality according to an embodiment. It should be appreciated that the particular details referred to hereinbelow are illustrative only and are not meant to be limiting. One skilled in the art could readily contemplate other elements or steps and still remain within the scope and spirit of the claimed subject matter.

Overview

The To-Do List provides the family the ability to create and manage multiple To-Do lists and tasks, including the ability to distribute To-Do lists via text message to family members according to an embodiment.

Access|Users can Access their to-do List from the fcApplication and from Supported Mobile Devices.

In an embodiment, the To-Do list feature is accessible as one of the top main feature tabs on the fcApplication. See the Home section hereinabove for further details.

The To-Do list follows the paradigm of the left pane and right pane view discussed herein and as follows:
- The left pane provides the menu option to view different To-Do lists, as well as a Month View Mini-Calendar, in an embodiment.
- The right pane view provides the detailed view of the To-Do list wherein the user can perform operations including, but not limited to: create new tasks, edit or delete existing tasks, check-off completed tasks, print the task list, and send the task list to a family member's mobile phone, if configured.

In an embodiment, the To-Do lists are accessible from DECT and mobile phone smart phone FC applications. For a description of an exemplary DECT phone, refer to the instant application's co-pending parent U.S. patent application Ser. No. 11/745,888, filed 8 May 2007.

Left Pane View|Users have Access to Multiple to-do Lists and a Mini-Calendar.

In an embodiment, users see a list of multiple to-do lists at the top of the Left Pane View and each To-Do list has its own tab. When the user clicks on a particular list tab, the to-do list associated with the particular list tab is displayed in the right pane view.

User can Create and Manage Multiple 'to-do' Lists
- NEW|User can click a '+' on the left pane to create a new list. User can enter a customized list title or use the default title, e.g. 'New List'. New lists are added to the bottom of the lists.
- EDIT and DELETE|User can hover over the list title and see an option to 'edit' the list, as follows:
  - User clicks on the 'edit' link, and user can edit the title or delete the list.
  - If the user chooses to delete a list and the list contains tasks, the application asks the user to confirm such deletion and indicates that deleting the list may delete all to-do items.
- MOVE|User can drag list by the header to reorder the set of lists.

DEFAULT|The User May have the Following Default To-Do Lists
- A generically titled 'To-Do' list when no family members have been created.
  - First prepopulated task in the list may be 'Create family member in the Family Center'.
- A 'To-Do' list for every family member with the name of each family member as the title of the To-Do list, e.g. "Chris' To-Do List".
  - With the addition of each new family member, a new list is associated with that new family member is created.
  - With the deletion of a family member, the list associated with the deleted family member is deleted.
    - As well, any associated data for that family member is deleted in the family member removal dialog box.
  - If a family member name changes, then the name of the To-Do list title changes to match the changed name.
- In an embodiment, a default To-Do list titled 'Grocery List' is created.

It should be appreciated that upon a rendered first view and upon a rendered application reset view of the To-Do list, a user may see the Generic 'To-Do' List View. On subsequent entries into the To-Do list, the To-Do list application component remembers the last viewed list or causes the last viewed list to be stored and returns to that list view.

Mini-Calendar

In an embodiment, the user sees a mini-calendar at the bottom of the left pane view with the month and year as the title. When activated, the calendar is displayed showing a full month and with the current date highlighted. The user may have the ability to scroll forward and backwards to view previous and subsequent months. The default view is the current month.

In the month view, dates that have events assigned to them are demarked, e.g. bolded.

User can click on a date and the mini-calendar application component displays the calendar with the clicked upon date view presented.

Right Hand View|to-do List View

In an embodiment, the items from the selected To-Do list are listed from oldest to newest, unless reordered.

A user can click on a button to print a selected To-Do list.
Lists may be printed with the title of the To-Do list, the date printed, and data from each individual item that has a checkbox checked, including the item's description.

User can send a selected To-Do list to a family member's or {all family} configured mobile phone(s) as a text message.
The text message may be formatted as follows: "{to-do list title}: {item1}, {item2}, . . . , {item n}".
When necessary, the list may be split into multiple text messages. Each text message may denote '(x/n)', where x=the number of the particular text messages sent in queue and n=total number of text messages sent.
When a list is split into multiple text messages, each task or item appears in its entirety within a text message, e.g. part of a task or item does not appear in separate text message.
More details about setting text message phone configuration may be found in the Settings section hereinabove.

User can Create a Task|Users can create new 'To-Do' task or item.
At the top of a To-Do list, a user can create a new task by entering text in a blank field. In an embodiment, the entered text is one-line and may not wrap to the next line in entering or viewing mode.
Once entered, the new task is added to the bottom of the To-Do list.
It is contemplated that a due date enterable or readable field associated with the task is displayed.

Edit a Task|Users can edit existing tasks.
A user can click on the task and change the text.
A user can drag and drop tasks within the list to reorder the tasks.
A user can move a task to another To-Do list by dragging the item to the targeted list.

Users have the ability to check off a task.
A user can check off a task, e.g. <check box: {default—unchecked}>. For example, once checked, the task has a line through the text to indicate that it has been completed.

Users have the ability to clear all completed tasks
A user can select a 'Clear Completed' to clear the completed tasks. For example, the list application component deletes the completed tasks from the list and compresses the list to show remaining open tasks.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An apparatus for delivery of family messages, network services, or third party application services that is independent of mode of transport and device platform, comprising:
a first application programming interface (API) from a set of one or more APIs that is used to receive a family message from a first device of a set of two or more devices;
a family message handling component that receives said family message and that determines based on said family message, rules data, and family data:
a second device of said two or more devices to which to send said family message, wherein said second device is different from said first device;
a schedule in accordance with which to send said family message; and
a second application programming interfaces (APIs) from a set of one or more APIs by which to send said family message, wherein said second API sends said family message to said second device; and
a family center storing component that is coupled to a database that stores said family data and stores a copy of said family message.

2. The apparatus of claim 1, further comprising:
a tile handler that (a) determines when and how to send one or more tiles to a client application that is associated with said second device and (b) sends said one or more tiles to said client application for display on said client application, wherein said one or more tiles are interactive.

3. The apparatus of claim 2, wherein said family message is displayed within a tile of said one or more tiles.

4. The apparatus of claim 1, wherein said second API is any of:
a family message protocol that is used to send said family message to a client application that displays said family message within a tile;
Short Message Service (SMS) that is used to send said family message when said second device is a standard mobile phone; and
Session Initiation Protocol (SIP) that is used when said second device is a SIP-enabled device.

5. The apparatus of claim 2, wherein said tile handler (a) receives a particular API from a third party application, (b) based in part on content that is contained in said particular API creates a particular data structure, and (c) sends said particular data structure to said client application which causes said client application to display said content in a tile of said one or more tiles.

6. The apparatus of claim 1, further comprising:
one or more network service components, each of which provide a network service to said second device;
wherein at least one of said network services is displayed within a tile that is within a client application that is associated with said second device.

7. The apparatus of claim 6, wherein any of said network services is voice mail, SMS, address book, local directory search, email, calendar, and tasks.

8. The apparatus of claim 2, wherein a tile of said one or more tiles has a relative priority as compared to other tiles of said one or more tiles, wherein said priority causes said tile to be displayed in a particular order as compared to a displayed order of said other tiles.

9. The apparatus of claim 2, wherein clicking a tile of said one or more tiles causes an event associated with said click to be tracked.

10. The apparatus of claim 2, wherein a tile of said one or more tiles comprises an executable program and wherein in response to clicking said tile, said executable program is executed.

11. The apparatus of claim 1, wherein said family message from a first device is an SMS message comprising message body and data reflecting a telephone network (TN), and wherein said family message handling component compares said data reflecting said TN to data of groups of families and when a match is found sends said message body only to members of said matched group.

12. The apparatus of claim 1, wherein:
said set of two or more devices is registered as a family with said family center storing component, wherein said registration is reflected in said family data and wherein a family contains two or more family members that are each associated with two or more users and that are each associated with one or more of said two or more devices;
said rules data and family data indicate personal preferences for each of said two or more family members and indicate type of device for each of said two or more devices;
said family message is intended for each family member that is not the family member that created said family message; and
said schedule indicates an order of said two or more family members in which to send said family message and a time at which to send said family message to each of said two or more family members.

13. A method for delivery of family messages, network services, or third party application services that is independent of mode of transport and device platform, comprising the steps of:
using a first application programming interface (API) from a set of one or more APIs to receive a family message from a first device of a set of two or more devices;
receiving, at a family message handling component, said family message and, based on said family message, rules data, and family data, determining:
a second device of said two or more devices to which to send said family message, wherein said second device is different from said first device;
a schedule in accordance with which to send said family message; and
a second application programming interfaces (APIs) from a set of one or more APIs by which to send said family message, wherein said second API sends said family message to said second device; and
storing, at a family center storing component that is coupled to a database, said family data and stores a copy of said family message.

14. The method of claim 13, further comprising the step of:
determining, by a tile handler, when and how one or more tiles are to be sent to a client application that is associated with said second device; and
sending said one or more tiles to said client application for display on said client application;
wherein said one or more tiles are interactive.

15. The method of claim 14, wherein said family message is displayed within a tile of said one or more tiles.

16. The method of claim 13, wherein said second API is any of:
a family message protocol that is used to send said family message to a client application that displays said family message within a tile;
Short Message Service (SMS) that is used to send said family message when said second device is a standard mobile phone; and
Session Initiation Protocol (SIP) that is used when said second device is a SIP-enabled device.

17. The method of claim 14, wherein said tile handler further comprises the steps of:
receiving a particular API from a third party application;
based in part on content that is contained in said particular API, creating a particular data structure; and
sending said particular data structure to said client application which causes said client application to display said content in a tile of said one or more tiles.

18. The method of claim 13, further comprising the step of:
providing, by each of one or more network service components, a network service to said second device;
wherein at least one of said network services is displayed within a tile that is within a client application that is associated with said second device.

19. The method of claim 18, wherein any of said network services is voice mail, SMS, address book, local directory search, email, calendar, and tasks.

20. The method of claim 14, wherein a tile of said one or more tiles has a relative priority as compared to other tiles of said one or more tiles, wherein said priority causes said tile to be displayed in a particular order as compared to a displayed order of said other tiles.

21. The method of claim 14, wherein clicking a tile of said one or more tiles causes an event associated with said click to be tracked.

22. The method of claim 14, wherein a tile of said one or more tiles comprises an executable program and wherein in response to clicking said tile, said executable program is executed.

23. The method of claim 13, wherein said family message from a first device is an SMS message comprising message body and data reflecting a telephone network (TN), and wherein said family message handling component compares said data reflecting said TN to data of groups of families and when a match is found sends said message body only to members of said matched group.

24. The method of claim 13, wherein:
said set of two or more devices is registered as a family with said family center storing component, wherein said registration is reflected in said family data and wherein a family contains two or more family members that are each associated with two or more users and that are each associated with one or more of said two or more devices;
said rules data and family data indicate personal preferences for each of said two or more family members and indicate type of device for each of said two or more devices;
said family message is intended for each family member that is not the family member that created said family message; and
said schedule indicates an order of said two or more family members in which to send said family message and a time at which to send said family message to each of said two or more family members.

* * * * *